United States Patent
Butcher et al.

(10) Patent No.: US 11,989,579 B2
(45) Date of Patent: May 21, 2024

(54) SECONDARY PROCESSOR PROXIED DEVICE OWNERSHIP SYSTEM

(71) Applicant: Dell Products L.P., Round Rock, TX (US)

(72) Inventors: Andrew Butcher, Cedar Park, TX (US); Shawn Joel Dube, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 143 days.

(21) Appl. No.: 17/492,880

(22) Filed: Oct. 4, 2021

(65) Prior Publication Data

US 2023/0105316 A1    Apr. 6, 2023

(51) Int. Cl.
| | |
|---|---|
| G06F 9/46 | (2006.01) |
| G06F 9/4401 | (2018.01) |
| G06F 9/48 | (2006.01) |
| G06F 21/57 | (2013.01) |
| G06F 21/85 | (2013.01) |

(52) U.S. Cl.
CPC ............ G06F 9/466 (2013.01); G06F 9/4401 (2013.01); G06F 9/4411 (2013.01); G06F 9/4812 (2013.01); G06F 21/572 (2013.01); G06F 21/85 (2013.01)

(58) Field of Classification Search
None
See application file for complete search history.

(56) References Cited

U.S. PATENT DOCUMENTS

| | | | | |
|---|---|---|---|---|
| 6,862,641 | B1* | 3/2005 | Strongin | G06F 21/72 |
| | | | | 726/17 |
| 7,043,581 | B1* | 5/2006 | Gulick | G06F 21/71 |
| | | | | 710/240 |
| 9,146,790 | B1* | 9/2015 | Dash | G06F 11/1425 |
| 10,055,234 | B1* | 8/2018 | Rao | G06F 9/4401 |
| 11,042,496 | B1* | 6/2021 | BeSerra | G06F 13/4282 |
| 2003/0005247 | A1* | 1/2003 | Chang | G06F 12/0223 |
| | | | | 711/163 |
| 2009/0172233 | A1* | 7/2009 | Zmudzinski | G06F 13/24 |
| | | | | 710/269 |
| 2011/0276793 | A1* | 11/2011 | Pulla | G06F 8/60 |
| | | | | 713/1 |
| 2012/0017073 | A1* | 1/2012 | Gillespie | G06F 9/44505 |
| | | | | 713/2 |
| 2012/0303682 | A1* | 11/2012 | Aronovich | G06F 16/182 |
| | | | | 707/826 |

(Continued)

*Primary Examiner* — Abu Zar Ghaffari
(74) *Attorney, Agent, or Firm* — Joseph Mencher

(57) ABSTRACT

The present disclosure enables proxied device ownership for a secondary processing system by providing a chassis housing a plurality of devices, a secondary processing system, and a central processing system that includes an integrated switch device that is coupled to each of the plurality of devices and the secondary processing system. The central processing system enter a Basic Input/Output System (BIOS) mode in which the central processing system provides a BIOS that is configured to execute instructions and, using the BIOS, receives a transaction that was generated by the secondary processing system and that is directed to a first device that is include in the plurality of devices, and executes the transaction on the first device.

20 Claims, 23 Drawing Sheets

(56) References Cited

U.S. PATENT DOCUMENTS

| | | | |
|---|---|---|---|
| 2013/0318336 A1* | 11/2013 | Yu | G06F 9/4401 |
| | | | 713/2 |
| 2014/0281092 A1* | 9/2014 | Jayakumar | G06F 11/0772 |
| | | | 710/269 |
| 2014/0372641 A1* | 12/2014 | Hearn | G06F 13/4022 |
| | | | 710/104 |
| 2014/0380403 A1* | 12/2014 | Pearson | G06F 21/57 |
| | | | 726/1 |
| 2015/0134728 A1* | 5/2015 | Liao | H04L 67/01 |
| | | | 709/203 |
| 2016/0011646 A1* | 1/2016 | Maity | G06F 9/4401 |
| | | | 713/324 |
| 2016/0011880 A1* | 1/2016 | Maity | G06F 9/4401 |
| | | | 710/261 |
| 2019/0042741 A1 | 2/2019 | Abodunrin et al. | |
| 2019/0156015 A1* | 5/2019 | Brannock | G06F 9/468 |
| 2019/0286611 A1* | 9/2019 | Slik | G06F 3/065 |
| 2020/0104535 A1* | 4/2020 | Talanki | G06F 12/0804 |
| 2021/0081538 A1* | 3/2021 | Zimmer | G06F 21/57 |

\* cited by examiner

SECONDARY PROCESSOR PROXIED DEVICE OWNERSHIP SYSTEM

BACKGROUND

The present disclosure relates generally to information handling systems, and more particularly to providing for ownership of devices by a secondary processing system in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, servers and/or other computing systems known in the art, often include devices (e.g., peripheral devices and/or other devices known in the art) that are conventionally coupled to and "owned" by the central processing system (e.g., a Central Processing Unit (CPU)) in that computing system such that the central processing system may configure those devices, set up and utilize queue pairs in those devices, perform memory, Input/Output (I/O), and message transactions with those devices, and/or perform any of a variety of other ownership operations that would be apparent to one of skill in the art in possession of the present disclosure. However, next-generation computing systems may be provided with a secondary processing system that is separate from the central processing system, and the inventors of the present disclosure have discovered that benefits may be realized by allowing each of the central processing system and the secondary processing system to own different subsets of the devices in the computing system. However, configuring a computing system to allow device ownership by each of a central processing system and a secondary processing system can raise some issues.

For example, such secondary processing systems may be provided in System Control Processors (SCPs) that are included in the computing system but that provide services for the computing system that are separate from the services provided by the central processing system. To provide a specific example, the central processing system in the computing system may provide a variety of conventional server functionality, while the secondary processing system provided with the SCP in the computing system may provide data storage functionality, networking functionality, firewall functionality, and/or other relatively higher-level functionality that may be enabled by the device(s) it owns and that is considered technically "separate" from the server functionality. However, while central processing systems are conventionally configured and designed for device ownership (e.g., via a built-in/integrated Peripheral Component Interconnect express (PCIe) switch device in the central processing system), configuring secondary processing systems such as the SCP discussed above similarly for device ownership introduces complexity and cost to the computing system, and can result in the secondary processing system becoming a bottleneck for data transfers between the devices it owns and the central processing system.

Accordingly, it would be desirable to provide a secondary processor device ownership system that addresses the issues discussed above.

SUMMARY

According to one embodiment, an Information Handling System (IHS) includes a central processing system including an integrated switch device; and a memory system that is coupled to the central processing system and that includes instructions that, when executed by the central processing system, cause the central processing system to: enter a Basic Input/Output System (BIOS) mode in which the central processing system provides a BIOS that is configured to execute instructions; receive, using the BIOS, a transaction that was generated by a secondary processing system that is coupled to the integrated switch device, and that is directed to a first device that is include in a plurality of devices that are coupled to the integrated switch device; and execute, using the BIOS, the transaction on the first device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
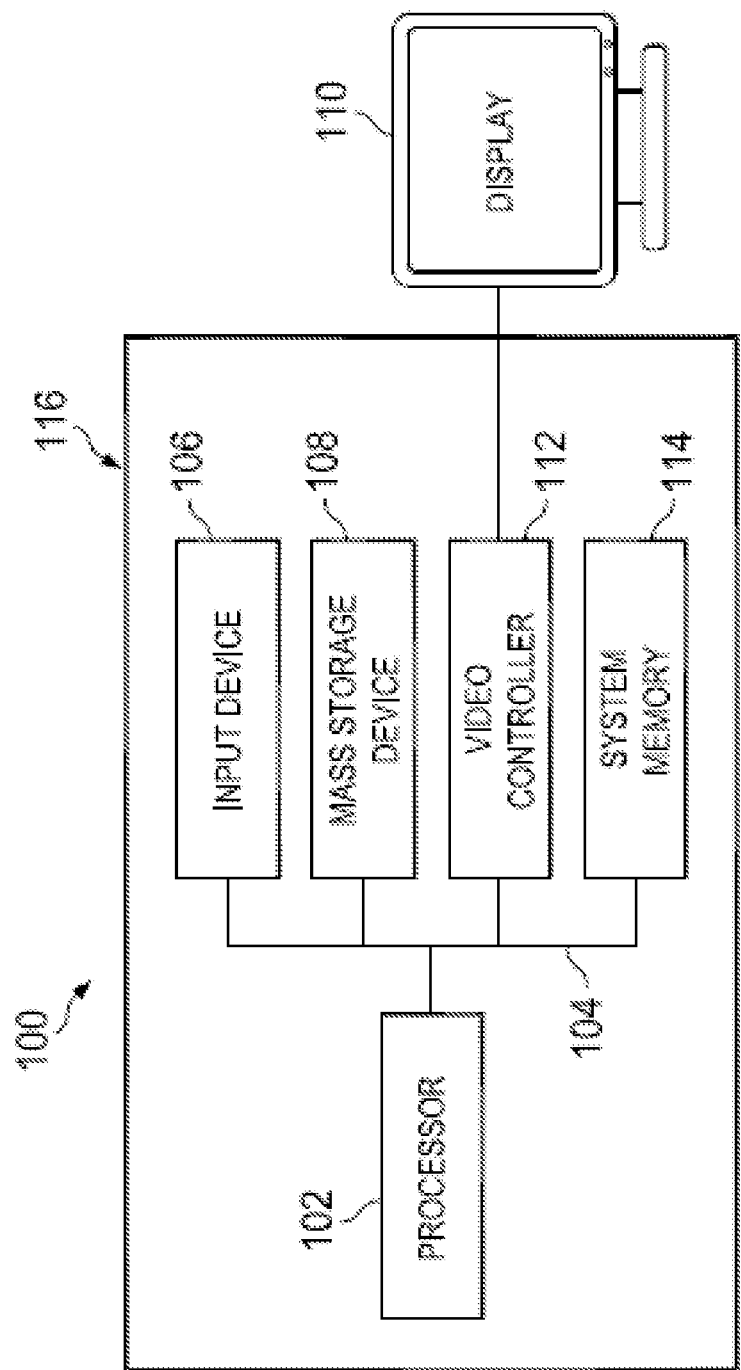
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
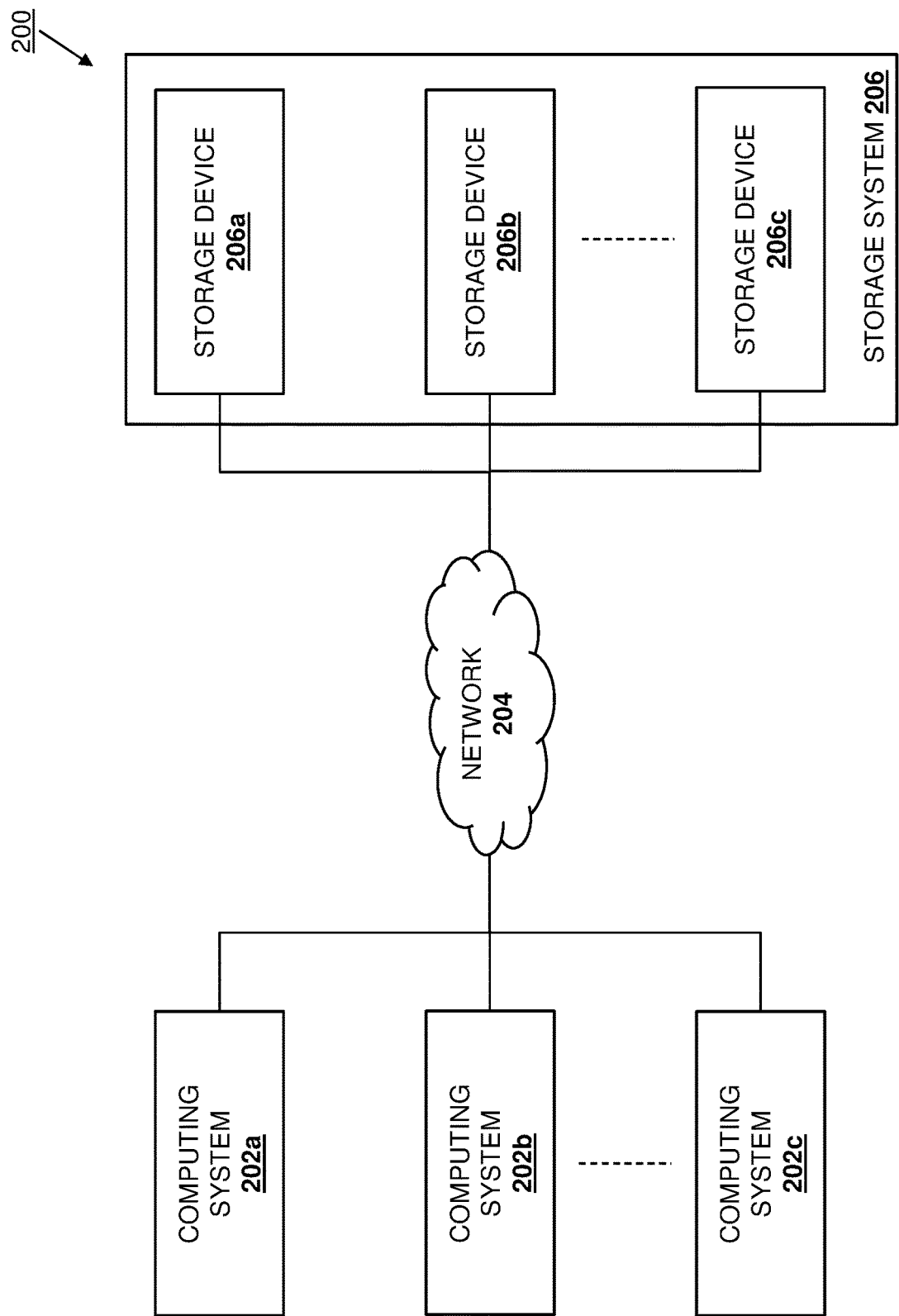
FIG. 2 is a schematic view illustrating an embodiment of a networked system that may include the secondary processor device ownership system of the present disclosure.

Referring now to FIG. 2, an embodiment of a networked system 200 is illustrated that may include the secondary processor device ownership system of the present disclosure. In the illustrated embodiment, the networked system 200 includes a plurality of computing systems 202a, 202b, and up to 202c. In an embodiment, any or each of the computing systems 202a-202c may be provided by the IHS 100 discussed above with reference to FIG. 1, and/or may include some or all of the components of the IHS 100, and in specific examples may be provided by server devices. However, while illustrated and discussed as being provided by server devices, one of skill in the art in possession of the present disclosure will recognize that computing systems provided in the networked system 200 may include any computing systems that may be configured to operate similarly as the computing systems 202a-202c discussed below. Each of the computing systems 202a-202c is coupled to network 204 that may be provided by a Local Area Network (LAN), the Internet, combinations thereof, and/or any other network that would be apparent to one of skill in the art in possession of the present disclosure.

In the illustrated embodiment, a storage system 206 is also coupled to the network 204, and in the illustrated example includes a plurality of storage devices 206a, 206b, and up to 206c. For example, the storage system 206 may be provided as a network-accessible storage for any of all of the computing systems 202a-202c. However, the computing systems 202a-202c are illustrated as capable of storing data in the storage system 206, one of skill in the art in possession of the present disclosure will appreciate how the computing systems 202a-202c described herein need not store data in a network-accessible storage, and that the secondary processor device ownership system of the present disclosure may be provided in computing systems configured to perform a variety of other functionality while remaining within the scope of the present disclosure as well. As such, while a specific networked system 200 has been illustrated and described, one of skill in the art in possession of the present disclosure will recognize that the secondary processor device ownership system of the present disclosure may include a variety of components and component configurations while remaining within the scope of the present disclosure as well.

Figure 3:
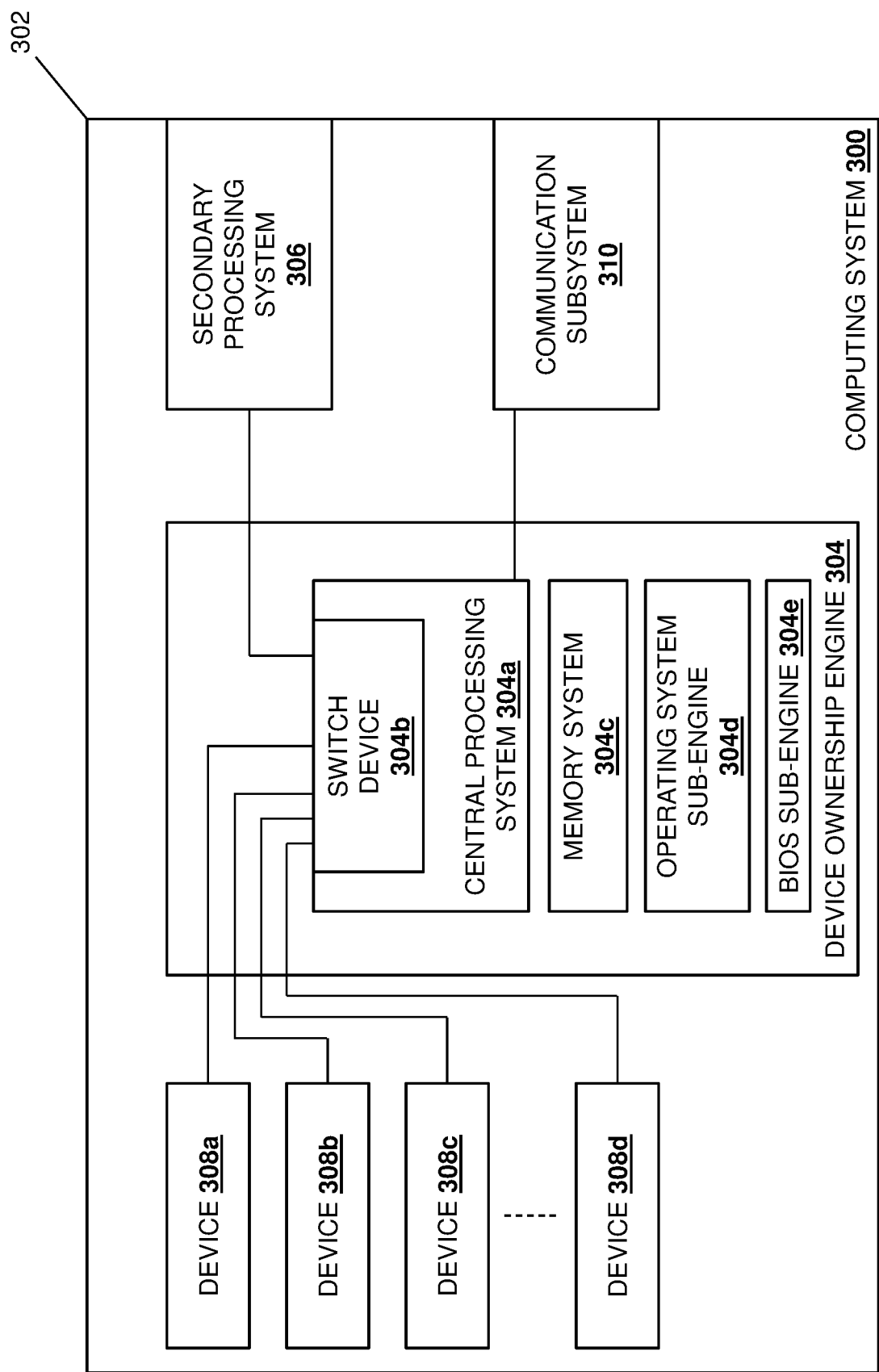
FIG. 3 is a schematic view illustrating an embodiment of a computing system that may be included in the networked system of FIG. 2 and that may provide the secondary processor device ownership system of the present disclosure.

Referring now to FIG. 3, an embodiment of a computing system 300 is illustrated that may provide any or each of the computing systems 202a-202c discussed above with reference to FIG. 2. As such, the computing system 300 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing system 300 discussed below may be provided by other devices that are configured to operate similarly as the computing system 300 discussed below. In the illustrated embodiment, the computing system 300 includes a chassis 302 that houses the components of the computing system 300, only some of which are illustrated and discussed below. For example, the chassis 302 may house a processing system (e.g., the processor 102 discussed above with reference to FIG. 1) and a memory system (e.g., the memory 114 discussed above with reference to FIG. 1) that is coupled to the processing system and that includes instructions that, when executed by the processing system, cause the processing system to provide a device ownership engine 304 that is configured to perform the functionality of the device ownership engines and/or computing systems discussed below.

In the specific example illustrated in FIG. 3, the device ownership engine 304 is provided by a central processing system 304a (e.g., a Central Processing Unit (CPU)) that includes an integrated switch device 304b such as, for example, a Peripheral Component Interconnect express (PCIe) switch device and/or other processing-system-integrated switch devices that would be apparent to one of skill in the art in possession of the present disclosure. As discussed above, the central processing system 304a may execute instructions included on a memory system 304c in order to provide the device ownership engine 304 to provide the device ownership engine 304. Furthermore, FIG. 3 illustrates how the central processing system 304a may execute instructions included on a memory system 304c in order to provide an operating system sub-engine 304d and a Basic Input/Output System (BIOS) sub-engine 304e, and one of skill in the art in possession of the present disclosure will appreciate how the central processing system 304a may execute instructions included on a memory system 304c to provide a variety of other applications and/or functionality as well. Furthermore, while the operating system sub-engine 304d and the BIOS sub-engine 304e are illustrated as included in or provided as part of (e.g., sub-engines of) the device ownership engine 304, one of skill in the art in possession of the present disclosure will appreciate how the operating system sub-engine 304d and the BIOS sub-engine 304e (or portions of the operating system sub-engine 304d and the BIOS sub-engine 304e) may be separate from the device ownership engine 304 while remaining within the scope of the present disclosure as well.

Further still, while illustrated and described as being provided by the central processing system 304a (and the memory system 304b) in the specific examples illustrated and described below, one of skill in the art in possession of the present disclosure will appreciate how at least some of the functionality of the device ownership engine 304 may be provided by subsystems in the chassis 302 other than the central processing system 304a while remaining within the scope of the present disclosure as well. For example, and as discussed in some of the examples provided below, the chassis 302 may house a Baseboard Management Controller (BMC) such as the integrated DELL® Remote Access Controller (iDRAC) available in server devices provided by DELL® Inc. of Round Rock, Texas, United States, and/or other BMCs/management devices known in the art. As described below, the BMC in the computing system 300 may operate to assist with or perform at least some of the device ownership functionality that is primarily discussed as being provided by the BIOS sub-engine 304e in many of the examples below.

The chassis 302 may also house a secondary processing system 306 that is coupled to the switch device 304b included in the central processing system 304a (e.g., via a PCIe connection). As discussed above, in specific examples the secondary processing system 306 may be provided as part of an SCP that is included in the chassis 302. In some examples, the SCP described herein may be conceptualized as an "enhanced" SmartNIC device that may be configured to perform functionality that is not available in conventional SmartNIC devices such as, for example, data storage functionality, networking functionality, firewall functionality, and/or other functionality that may be considered technically "separate" from the central processing functionality performed by the central processing system 304a and, as such, may be managed separately from that central processing functionality. However, while the secondary processing functionality of the present disclosure is illustrated and described as SCP functionality performed by an enhanced SmartNIC device provided by an SCP subsystem, one of skill in the art in possession of the present disclosure will appreciated that the secondary processor device ownership functionality described herein may be provided in computing systems utilizing other types of secondary processing systems providing other secondary processing functionality while remaining within the scope of the present disclosure as well.

In an embodiment, the SCP that includes the secondary processing system 306 in the chassis 302 may be provided by the IHS 100 discussed above with reference to FIG. 1 and/or may include some or all of the components of the IHS 100. In specific examples, the SCP may be provided as an SCP card that is configured to connect to a slot on a motherboard in the chassis 302. In other examples, the SCP that includes the secondary processing system 306 in the chassis 302 may be integrated into a motherboard in the chassis 302. In yet other examples the SCP that includes the secondary processing system 306 in the chassis 302 may be a separate/co-motherboard circuit board that is connected to a motherboard in the chassis 302 (e.g., a two-part motherboard having a first portion that enables conventional motherboard functionality, and a second portion that enables the SCP functionality discussed below). In a specific example, the SCP that includes the secondary processing system 306 in the chassis 302 may be referred to as a Data Processing Unit (DPU) that may be provided by a PCIe card including Advanced Reduced Instruction Set Computing (RISC) Machine (ARM) core(s) and a network interface. However, while a few specific examples are provided, one of skill in the art in possession of the present disclosure will appreciate that the SCP that includes the secondary processing system 306 in the chassis 302 may be provided in the computing system 300 in a variety of manners that will fall within the scope of the present disclosure.

In the illustrated embodiment, the chassis 302 also houses a plurality of devices 308a, 308b, 308c, and up to 308c that may be provided by peripheral devices and/or other devices that would be apparent to one of skill in the art in possession of the present disclosure. As illustrated, each of the devices 308a-308d is coupled to the switch device 304b that is included in the central processing system 304a. The chassis 302 may also house a communication system 310 that is coupled to the central processing system 304a and that may be provided by a Network Interface Controller (NIC), wireless communication systems (e.g., BLUETOOTH®, Near Field Communication (NFC) components, WiFi components, cellular components, etc.), and/or any other communication components that would be apparent to one of skill in the art in possession of the present disclosure. However, while a specific computing system 300 has been illustrated and described, one of skill in the art in possession of the present disclosure will recognize that computing systems (or other devices operating according to the teachings of the present disclosure in a manner similar to that described below for the computing systems 300) may include a variety of components and/or component configurations for providing conventional computing system functionality, as well as the functionality discussed below, while remaining within the scope of the present disclosure as well.

Figure 4:
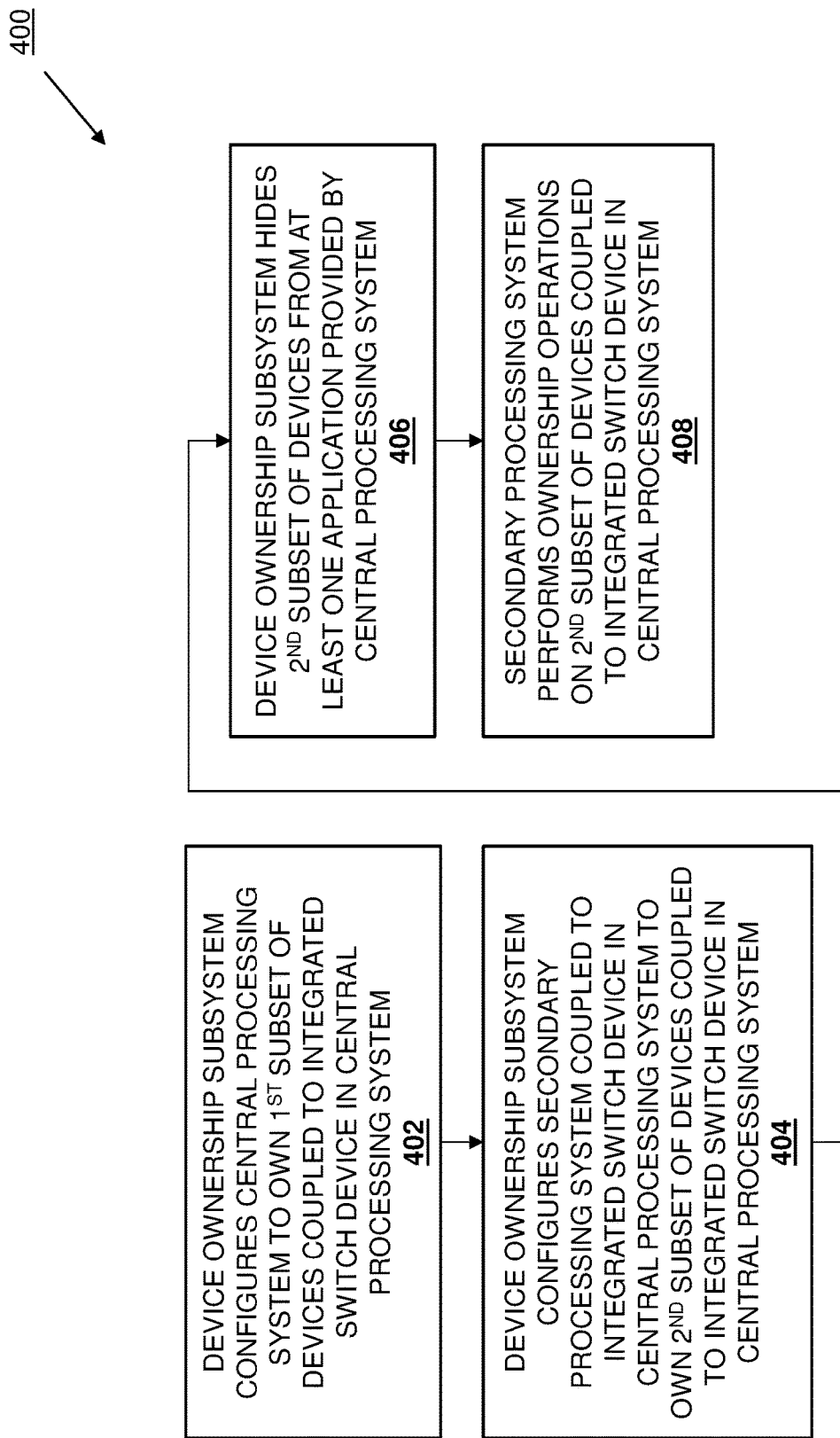
FIG. 4 is a flow chart illustrating an embodiment of a method for providing device ownership for a secondary processing system.

Referring now to FIG. 4, an embodiment of a method 400 for providing device ownership for a secondary processing system is illustrated. As discussed below, the systems and methods of the present disclosure provide for indirect ownership of devices by a secondary processing system via a "bridge" provided in part by an integrated switch device in a central processing system. For example, the secondary processor device ownership system of the present disclosure may include a chassis that houses a plurality of devices, a secondary processing system, and a central processing system that includes an integrated switch device that is coupled to each of the plurality of devices and the secondary processing system. The central processing system is configured to provide a device ownership subsystem that configures the central processing system to own a first subset of the plurality of devices, configures the secondary processing system to own a second subset of the plurality of devices, and hides the second subset of the plurality of devices from at least one application provided by the central processing system. As such, "separate" device ownership by the central processing system and the secondary processing system is provided without the added complexity and costs associated with physically directly connecting the secondary processing system to those devices, and without introducing the secondary processing system as a bottleneck for data transfers between the central processing system and the devices owned by the secondary processing system.

Figure 5:
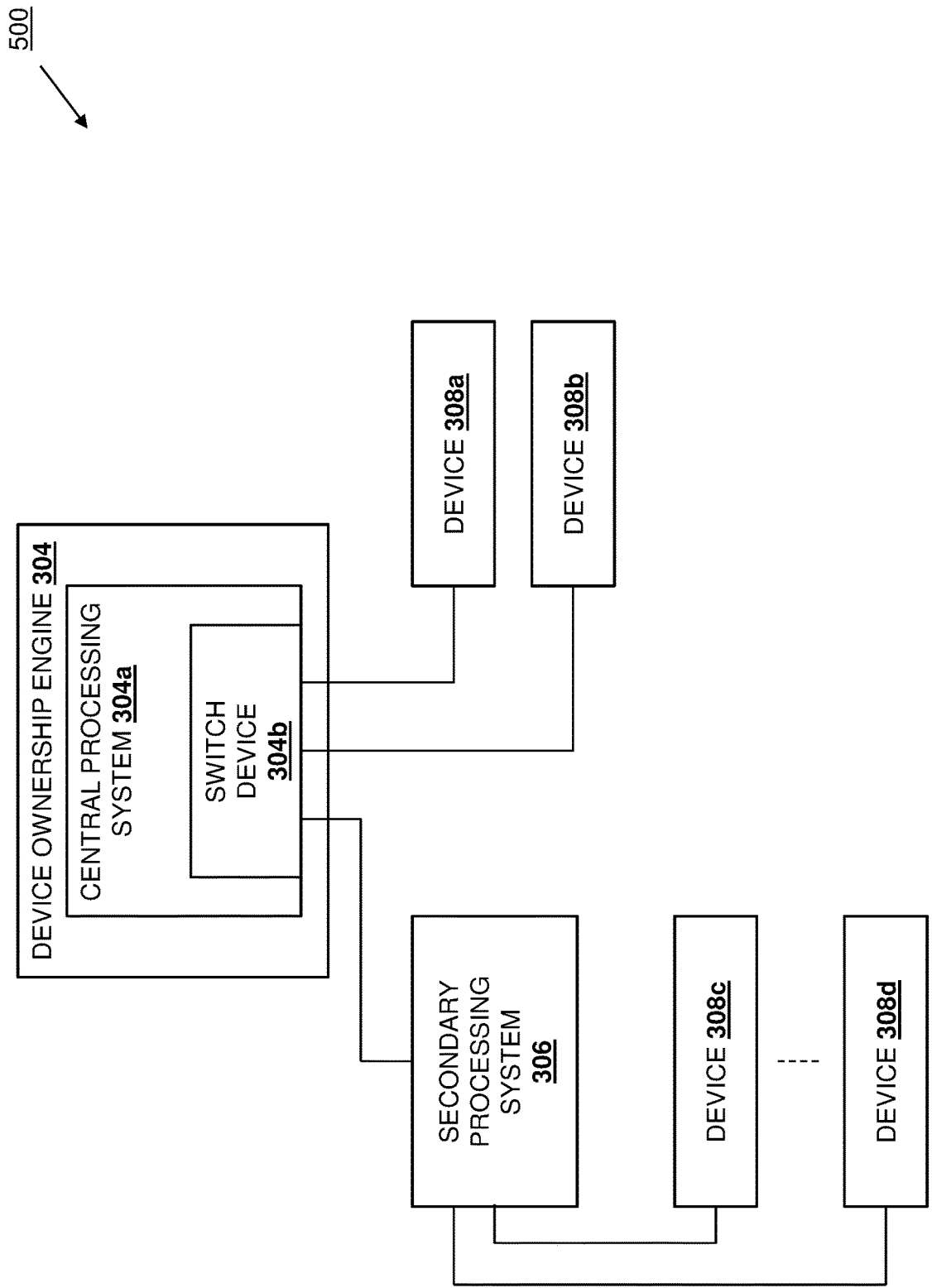
FIG. 5 is a schematic view illustrating an embodiment of a logical configuration of the computing system of FIG. 3 that provides an example of how a central processing system in the computing device views devices in the computing device during the method of FIG. 4.

The method 400 begins at block 402 where a device ownership subsystem configures a central processing system to own a first subset of devices coupled to an integrated switch device in the central processing system. As discussed above with reference to FIG. 3, the secondary processing system 306 and each of the devices 308a-308d are connected to the switch device 304b that is integrated in the central processing system 304a. However, with reference to FIG. 5, a logical configuration 500 is provided that illustrates how the central processing system 304a may be configured to view each of the device 308a, the device 308b, and the secondary processing system 306 as directly connected to its switch device 304b. In an embodiment, at block 402, the device ownership engine 304 provided by the central processing system 304a may configure the central processing system 304a to own the devices 308a and 308b, and one of skill in the art in possession of the present disclosure will recognize how devices directly connected to an integrated switch device on a central processing system (e.g., peripheral devices directly connected to a PCIe switch on a CPU) may be owned by that central processing system using a variety of device ownership techniques that will fall within the scope of the present disclosure.

The method 400 then proceeds to block 404 where the device ownership subsystem configures a secondary processing system coupled to the integrated switch device in the central processing system to own a second subset of the device coupled to the integrated switch device in the central processing system. With continued reference to FIG. 5, in an embodiment of block 404 and as discussed above, the logical configuration 500 illustrates how the central processing system 304a may be configured to view the device 308a, the device 308b, and the secondary processing system as being coupled to its switch device 304d. In one embodiment, all the devices 304a-304d may initially be viewed by the central processing system 304a as being directly connected to its switch device 304d (e.g., immediately following initialization of the computing system 300), and at block 404 the device ownership engine 304 may operate to reassign ownership of the devices 308c and up to 308d to the secondary processing system 306.

In a specific example, the reassignment of the ownership of the devices 308c and up to 308d from the central processing system 304a to the secondary processing system 306 may include the device ownership engine 304 generating or otherwise performing a logical hot-plug eject operation that operates to logically disconnect each of the devices 308c and up to 308d from the central processing system 304a, and then generating or otherwise performing a logical hot-plug connect operation to logically connect each of the devices 308c and up to 308d to the secondary processing system 306. However, while a specific technique to assign ownership of devices to a secondary processing system has been described, one of skill in the art in possession of the present disclosure will recognize how ownership of devices directly connected to an integrated switch device on a central processing system (e.g., peripheral devices directly connected to a PCIe switch on a CPU) may be assigned to a secondary processing system using other device ownership techniques that will fall within the scope of the present disclosure as well.

Figure 6:
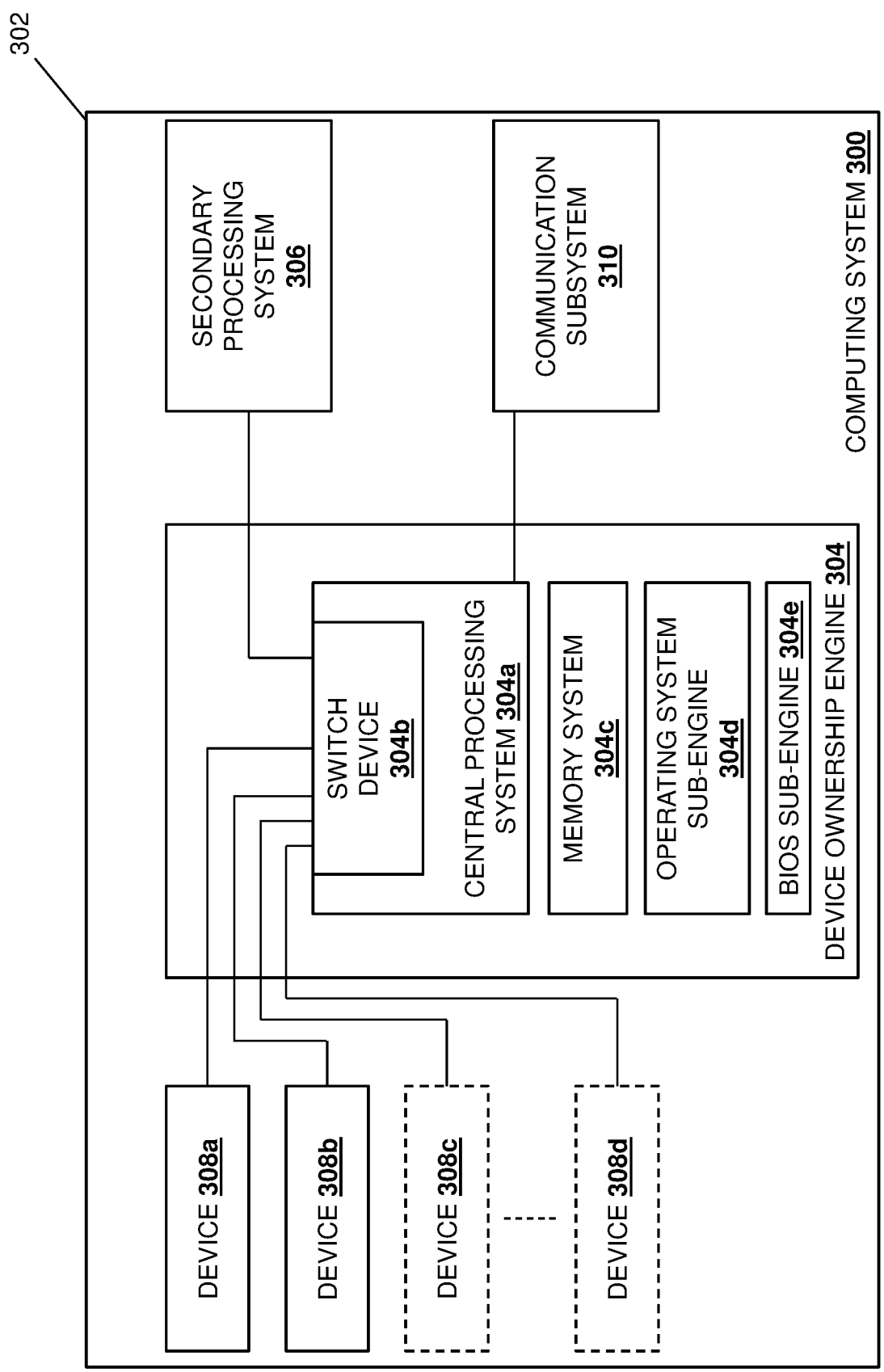
FIG. 6 is a schematic view illustrating an embodiment of the hiding of devices from a central processing system in the computing system of FIG. 3 during the method of FIG. 4.

The method 400 then proceeds to block 406 where the device ownership subsystem hides the second subset of the devices from at least one application provided by the central processing system. With reference to FIG. 6, in an embodiment of block 406, the device ownership engine 304 may operate to hide the devices 308c and up to 308d from the central processing system 304a (as indicated by each of the devices 308c and up to 308d illustrated by dashed lines in FIG. 6). For example, the device ownership engine 304 may include a System Firmware Intermediary (SFI) that one of skill in the art in possession of the present disclosure will recognize may be provided by a system firmware layer that is located between an operating system provided by the operating system sub-engine 304d and the devices 308a-308d connected to the switch device 304b on the central processing system 304a. In an embodiment of block 406, the device ownership engine 304 may utilize the SFI at block 406 to hide the devices 308c and up to 308d from the operating system provided by the operating system sub-engine 304d. As will be appreciated by one of skill in the art in possession of the present disclosure, the PCIe base specification describes an embodiment of an SFI that isolates PCIe hot-plug events for PCIe devices from the operating system, drivers, and applications in a computing device, and provides options to invoke system firmware for those hot plug events. The inventors of the present disclosure have discovered that the capabilities of the SFI may be leveraged to hide PCIe devices from the operating system in order to allow a secondary processing system to own those devices as described herein. However, as discussed below, other techniques for hiding devices owned by a secondary processing system from application(s) provided by a central processing system will fall within the scope of the present disclosure as well.

As will be appreciated by one of skill in the art in possession of the present disclosure, while discussed as being performed in different blocks, the configuration of the central processing system 304a to own the devices 308a and 308b, the configuration of the secondary processing system 306 to own the devices 308c and up to 308d, and the hiding of the devices 308c and up to 308d from application(s) provided by the central processing system 304a, may be performed in different orders or at substantially the same time in order to "separate" the ownership of the devices 308a and 308b by the central processing system 304a, and the ownership of the devices 308c and up to 308d by the secondary processing system 306. Thus, following block 406, the central processing system 304a "owns" the devices 308a and 308b such that the central processing system 304a may configure those devices 308a and 308b, set up and utilize queue pairs on those devices 308a and 308b, perform memory, Input/Output (I/O), and message transactions with those devices 308a and 308b, and/or perform any of a variety of other ownership operations that would be apparent to one of skill in the art in possession of the present disclosure.

Figure 7A:
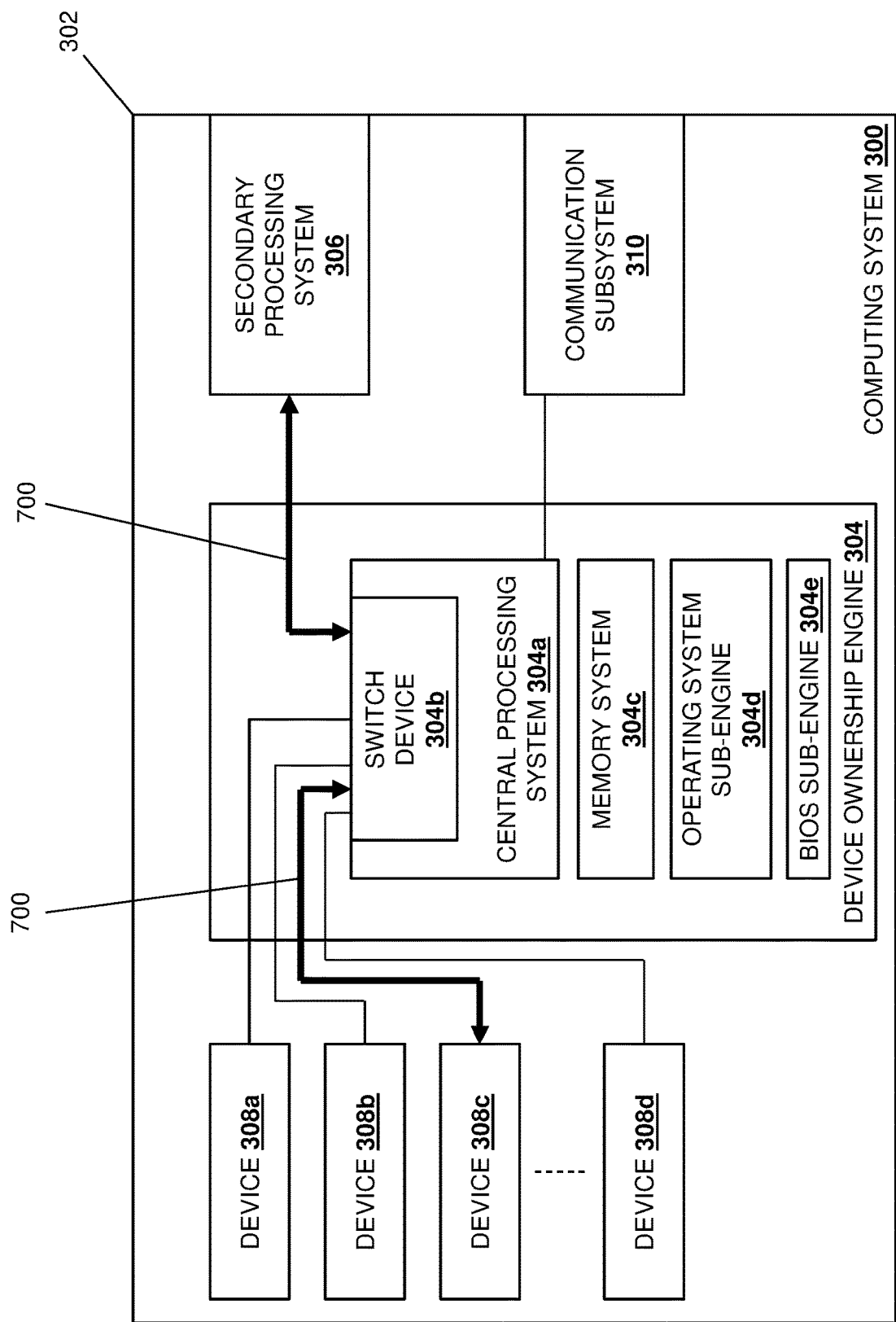
FIG. 7A is a schematic view illustrating an embodiment of peer-to-peer communications between a secondary processing system and a device in the computing system of FIG. 3 via a switch device in the computing system during the method of FIG. 4.
Figure 7B:
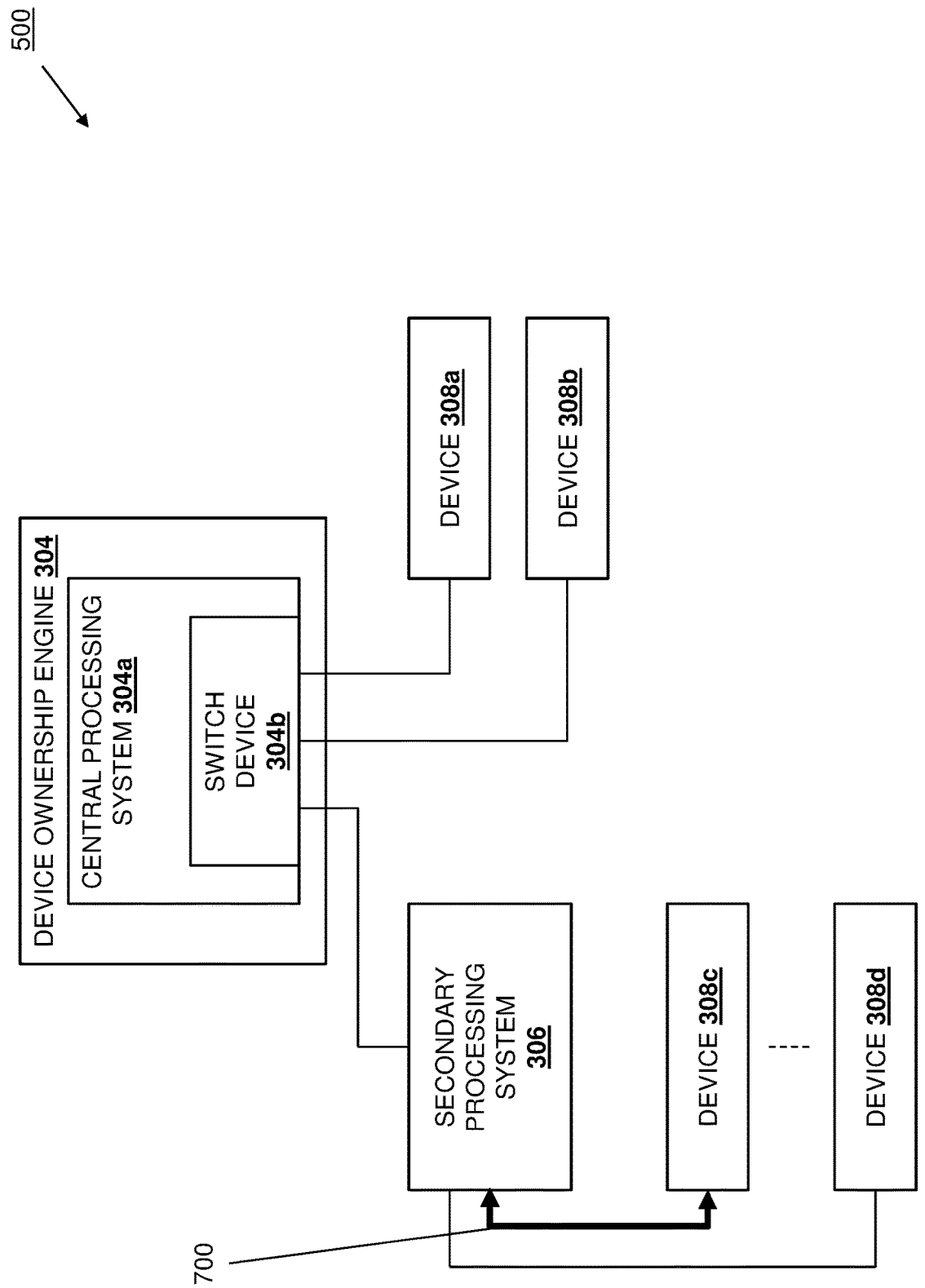
FIG. 7B is a schematic view illustrating an embodiment of how the peer-to-peer communications of FIG. 7A logically operate as direct peer-to-peer communications in the computing system of FIG. 3 during the method of FIG. 4.

The method 400 then proceeds to block 408 where the secondary processing system performs ownership operations on the second subset of the devices coupled to the integrated switch device in the central processing system. In an embodiment, following block 406 and at block 408, the secondary processing system 306 "owns" the devices 308c and up to 308d such that the secondary processing system 306 may configure those devices 308c and up to 308d, set up and utilize queue pairs on those devices 308c and up to 308d, perform memory, Input/Output (I/O), and message transactions with those devices 308c and up to 308d, and/or perform any of a variety of other ownership operations that would be apparent to one of skill in the art in possession of the present disclosure. For example, FIG. 7A illustrates how at block 408 the secondary processing system 306 may perform peer-to-peer communication operations 700 that include the secondary processing system 306 physically exchanging peer-to-peer communications via the switch device 304b in the central processing system 304a and with the device 308c, but FIG. 7B illustrates how those peer-to-peer communications logically operate as direct peer-to-peer communications between the secondary processing system 306 and the device 308c.

Figure 8A:
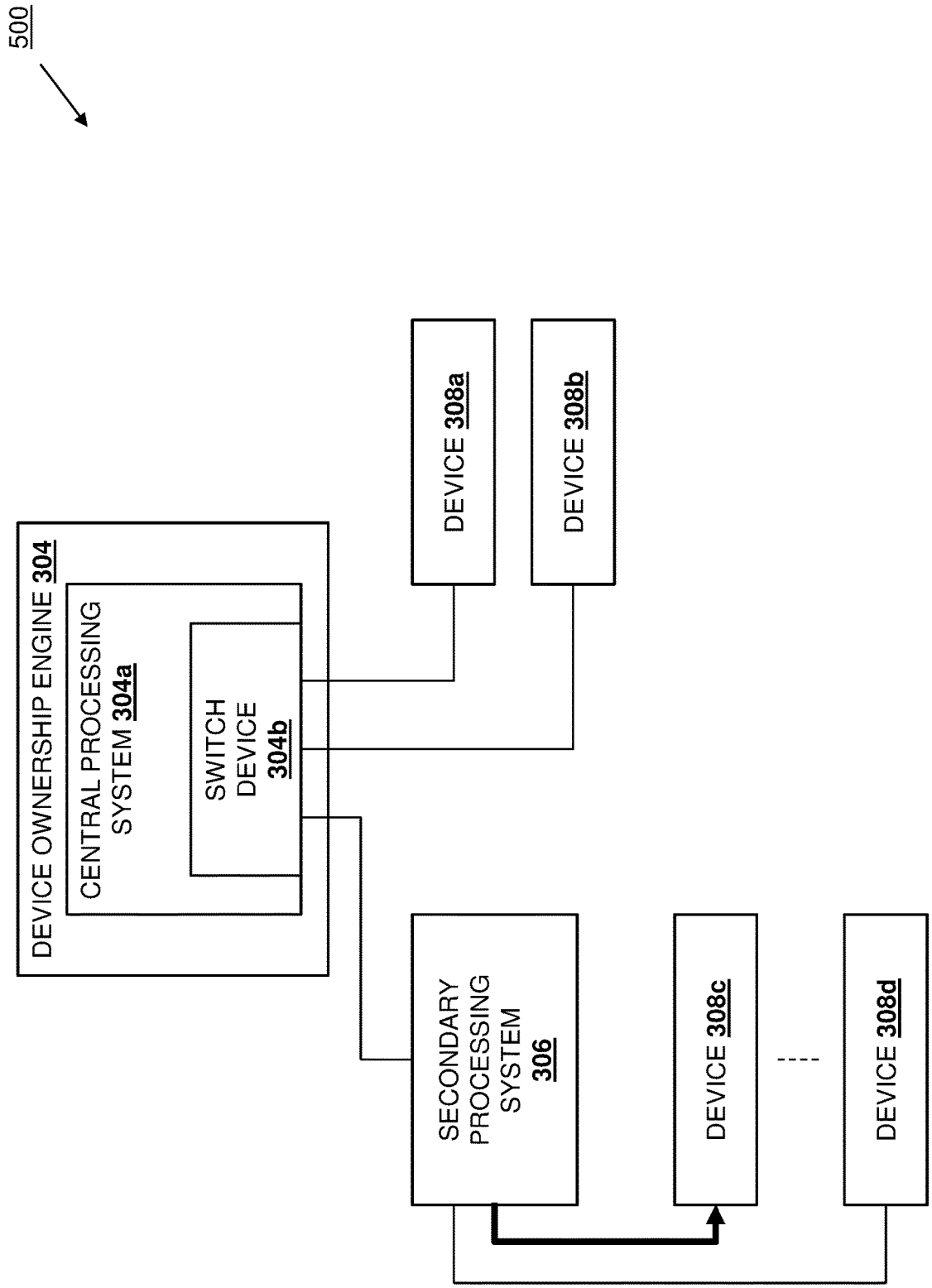
FIG. 8A is a schematic view illustrating an embodiment of logically direct peer-to-peer communications from a secondary processing system to a device in the computing system of FIG. 3 during the method of FIG. 4.
Figure 8B:
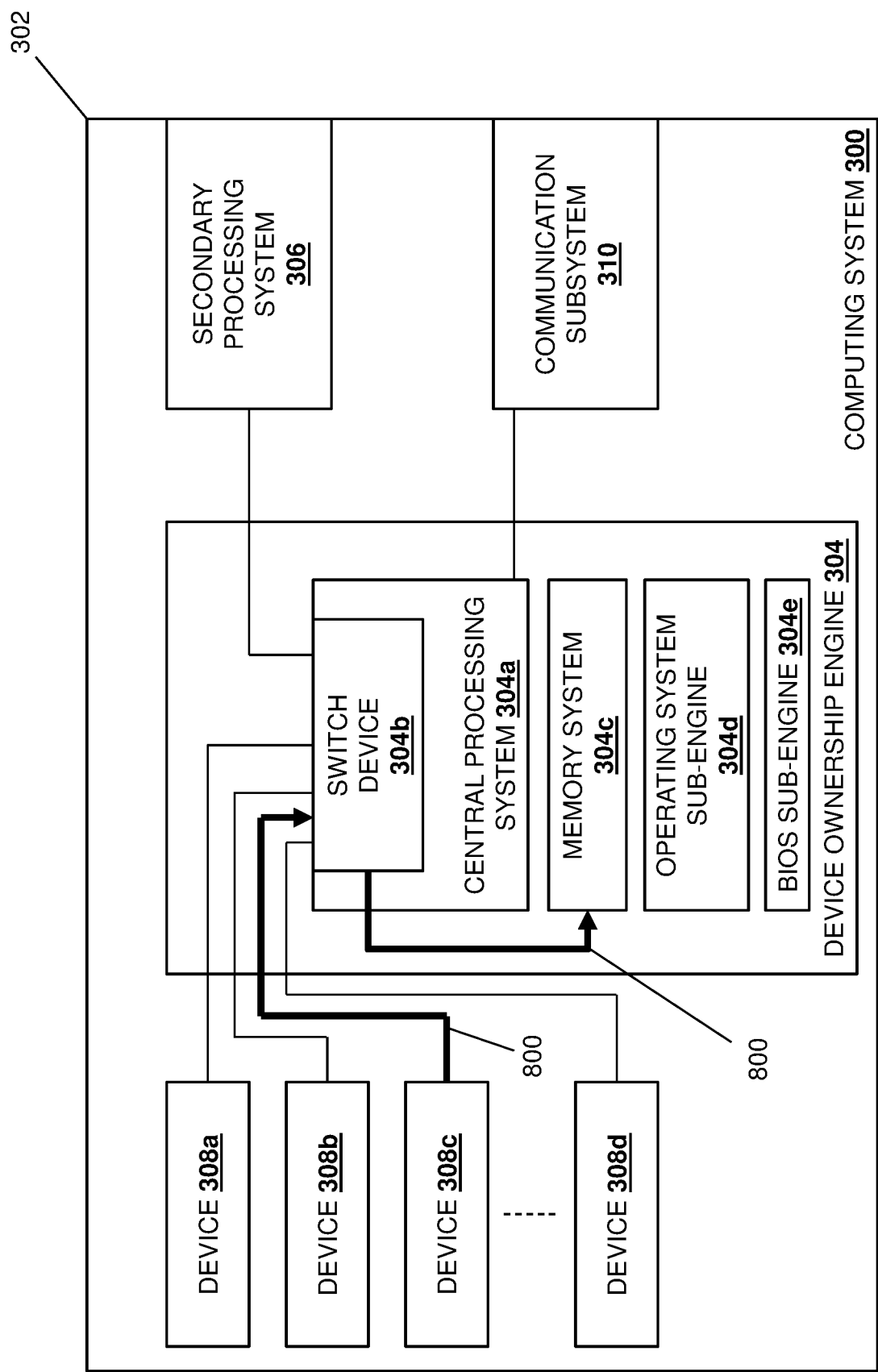
FIG. 8B is a schematic view illustrating an embodiment of data transfer operations from a device in the computing system of FIG. 3 to a memory system in the computing device during the method of FIG. 4.

In another example, with reference to logical configuration illustrated FIG. 8A, the peer-to-peer communications transmitted by the secondary processing system 306 to the device 308c may include a data transfer command that directs the transfer of data to the central processing system 304a, which one of skill in the art in possession of the present disclosure will recognize may be provided in response to a request for that data that was transmitted by the central processing system 304a to the secondary processing system 306 via its switch device 304b. As illustrated in FIG. 8B, in response to that data transfer command, the device 308c may perform direct data transfer operations 800 that may include transmitting the data via the switch device 304b in the central processing system 304a and to the memory system 304c. Furthermore, one of skill in the art in possession of the present disclosure will appreciate how the device 308c may be a Non-Volatile Memory express (NVMe) storage device or other device that is capable of writing data directly to the memory system 304c, and thus the direct data transfer operations 800 may include the device 308c directly writing data to the memory system 304c while remaining within the scope of the present disclosure as well. As will be appreciated by one of skill in the art in possession of the present disclosure, the ability of devices owned by the secondary processing system 306 to perform direct data transfers to the central processing system 304a and/or its memory system 304c further reduces the occurrence of data transfer delays (e.g., "bottlenecks") that would otherwise be introduced by the ownership of such devices by a secondary processing system.

Figure 9:
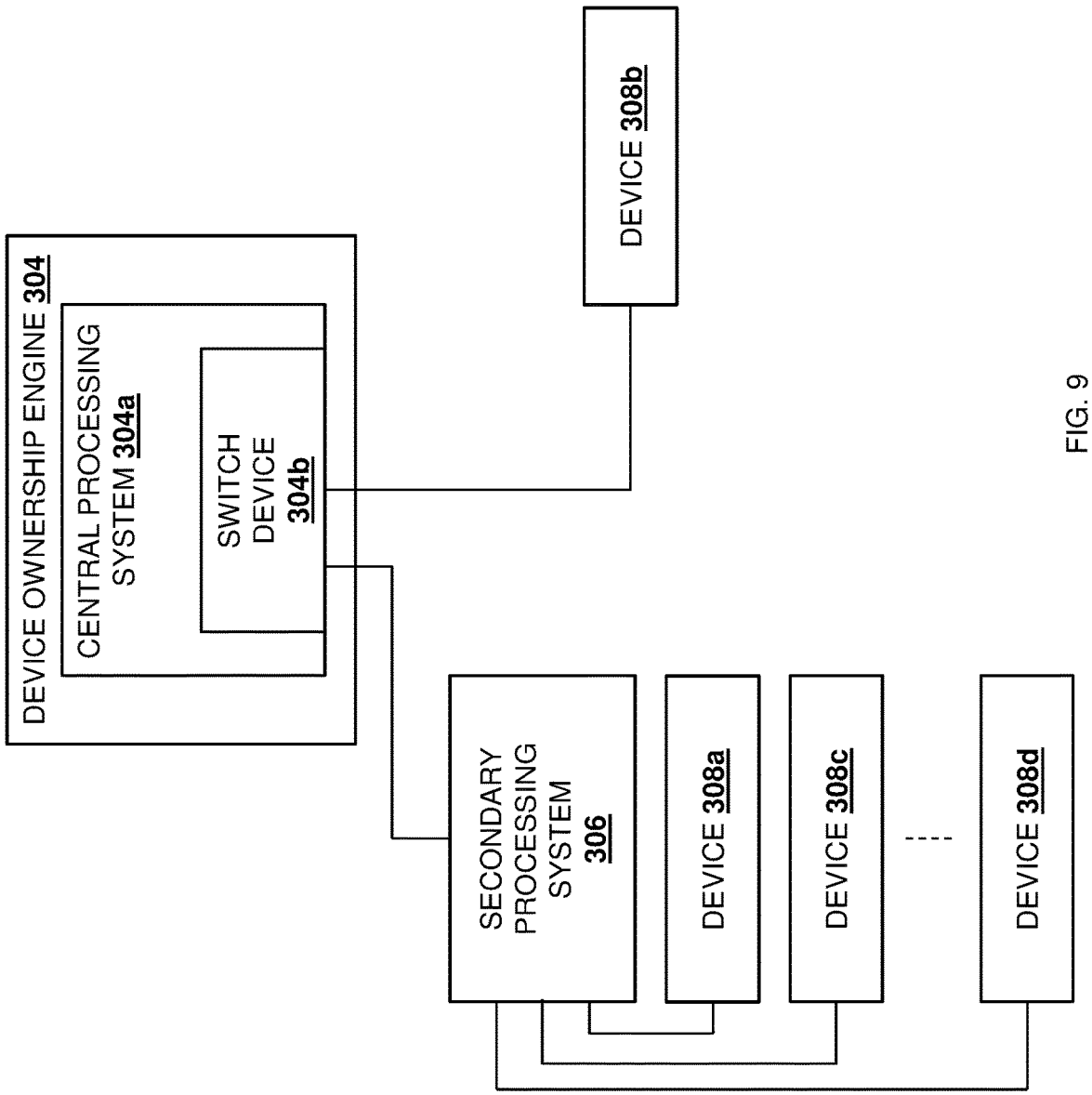
FIG. 9 is a schematic view illustrating an embodiment of a logical configuration of the computing system of FIG. 3 in which device ownership has been changed (relative to the embodiment of FIG. 5) from a central processing system to a secondary processing system in the computing device during the method of FIG. 4.

One of skill in the art in possession of the present disclosure will also recognize how the teachings of the present disclosure allow the logical configuration of the computing system 300 to be modified without the need to change any of the physical connections of the devices 308a-308d. For example, FIG. 9 illustrates a logical configuration 900 in which the ownership of the device 308a has been changed from the central processing system 304a to the secondary processing system 306 (e.g., as compared to the logical configuration 500 discussed above). As will be appreciated by one of skill in the art in possession of the present disclosure, the modification of the logical configuration 500 to the logical configuration 900 may include the device ownership engine 304 generating or otherwise performing a logical hot-plug eject operation that operates to logically disconnect the device 308a from the central processing system 304a, generating or otherwise performing a logical hot-plug connect operation to logically connect the device 308a to the secondary processing system 306, and hiding the device 308a from the application(s) provided by the central processing system 304a, substantially as described above with regard to the method 400.

Thus, the systems and methods of the present disclosure provide for indirect ownership of devices by a secondary processing system via a "bridge" provided at least in part by an integrated switch device in a central processing system. As will be appreciated by one of skill in the art in possession of the present disclosure, the physical/logical configuration of the computing system 300 discussed above that leverages the integrated switch device 304b in the central processing system 304a provides cost savings relative to providing a separate switch device (e.g., a PCIe switch device) in the computing system 300 for the secondary processing system 306 (i.e., to directly connect that secondary processing system to devices), and allows for dynamic reconfigurability of device ownership in the computing system 300 between the central processing system 304a and the secondary processing system 306. As such, a single physical configuration (e.g., the configuration illustrated in FIG. 3) allows for any of a variety of different logical central processing system/ secondary processing system device ownership configurations, which one of skill in the art in possession of the present disclosure will appreciate may be useful in multi-tenancy situations (e.g., when multiple Virtual Machines (VM's) are provided by the computing system 300), and/or other scenarios as well.

Figure 10:
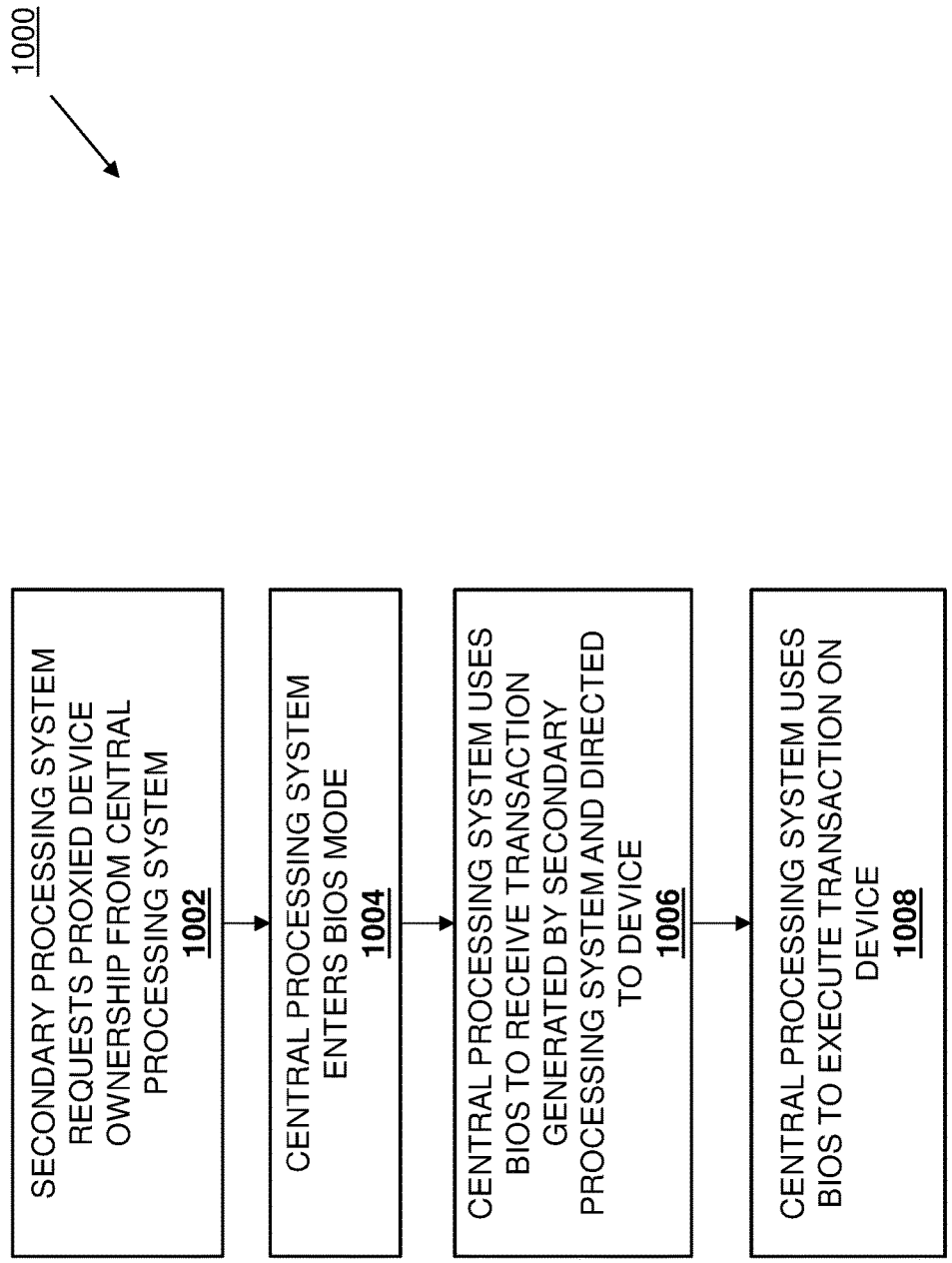
FIG. 10 is a flow chart illustrating an embodiment of a method for proxied device ownership for a secondary processing system.

Referring now to FIG. 10, an embodiment of a method 1000 for proxied device ownership for a secondary processing system is illustrated. As discussed below, some central processing systems may be configured to disallow or otherwise prevent the peer-to-peer communications or other transactions discussed above as being performed between the secondary processing system and the devices for which ownership has been assigned to that secondary processing system via the method 400. As such, the method 1000 provides for the proxying of communications between the secondary processing system and devices which it owns via the central processing system. For example, the secondary processor proxied device ownership system of the present disclosure may include a chassis housing a plurality of devices, a secondary processing system, and a central processing system that includes an integrated switch device that is coupled to each of the plurality of devices and the secondary processing system. The central processing system enters a Basic Input/Output System (BIOS) mode in which the central processing system provides a BIOS that is configured to execute instructions and, using the BIOS, receives a transaction that was generated by the secondary processing system and that is directed to a first device that is include in the plurality of devices, and executes the transaction on the first device. As such, in situations in which a central processing system would otherwise disallow or prevent peer-to-peer communications or other transactions, secondary processing systems may be assigned ownership of devices and then communicate with those devices using the central processing system as a communication proxy.

As discussed above, for security reasons, some central processing systems (e.g., CPUs) may be configured to disallow or otherwise prevent peer-to-peer communications or other transactions (e.g., PCIe peer-to-peer transactions) in order to prevent a device in a computing system from "owning" a peer device in the manner described above with reference to the method 400. For example, some CPUs may be configured to disallow or otherwise prevent peer-to-peer PCIe configuration transactions such as device discovery transactions and device initialization transactions (e.g., while allowing peer-to-peer PCIe memory, I/O, and message transactions), which would otherwise prevent the secondary processing system 306 from configuring the devices it owns per the method 400, and/or otherwise performing the ownership operations described above. As will be appreciated by one of skill in the art in possession of the present disclosure, such functionality in central processing systems may be configurable (e.g., enabled/disabled via a central processing system setting) or not present in current or future central processing systems, but in central processing systems in which that functionality is present and not configurable (i.e., configurable to be disabled), the method 1000 may be performed to enable any of the peer-to-peer communications or other transactions discussed above with reference to the method 400 (and in particular examples, PCIe configuration transactions that allow the secondary processing system 306 to discover and initialization the devices it will own per the method 400), as well as any other peer-to-peer communications or other transactions that one of skill in the art in possession of the present disclosure would recognize as being performed to enable or take advantage of the method 400 discussed above.

The method 1000 begins at block 1002 where a secondary processing system requests proxied device ownership from the central processing system. In an embodiment, prior to or during the method 1000, the secondary processing system 306 may be informed of the devices it will own. For example, in embodiments in which the secondary processing system 306 is included in an SCP, a System Control Processor Manager (SCPM) may identify to the SCP the devices it will be assigned ownership via the method 400. As will be appreciated by one of skill in the art in possession of the present disclosure, an SCPM may be provided by relatively higher-level software associated with the SCP that requires relatively higher-level access privileges. For example, the SCPM discussed above may be provided by a remote subsystem or other entity (e.g., a management device that may be coupled to the computing system 202a/300 via the network 204) and may be configured to access the SCP that includes the secondary processing system 306 via a network port provided in the SCP or the communication system 310. However, while a specific example of the secondary processing system 306 being informed of the devices it will own has been described, one of skill in the art in possession of the present disclosure will appreciate that the secondary processing system 306 may identify the devices it will own in a variety of manners that will fall within the scope of the present disclosure as well.

Figure 11:
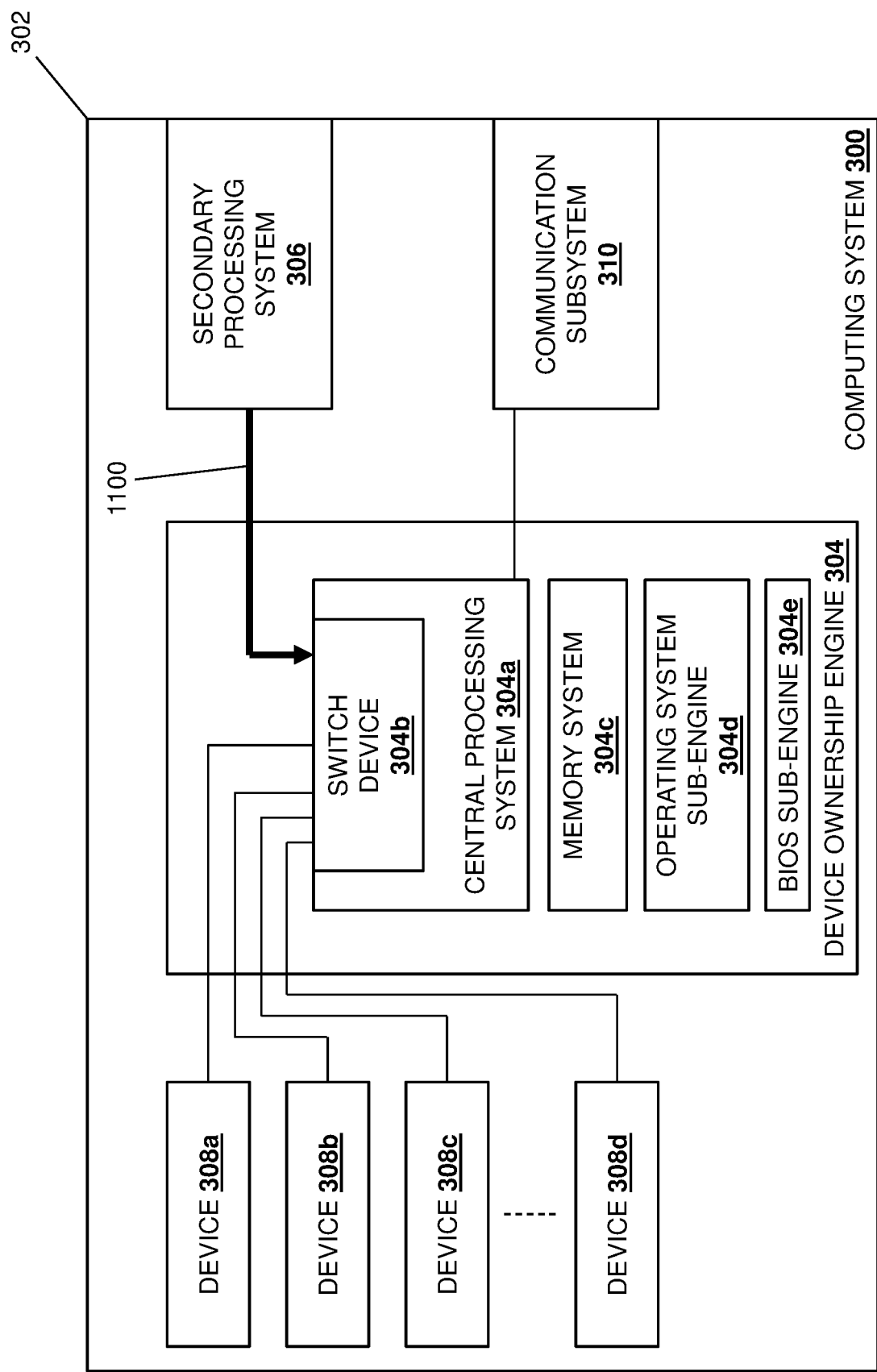
FIG. 11 is a schematic view illustrating an embodiment of a secondary processing system requesting proxied device ownership from a central processing system in the computing system of FIG. 3 during the method of FIG. 10.

With reference to FIG. 11, in an embodiment of block 1002, the secondary processing system 306 may perform proxied device ownership request operations 1100 that may include generating and transmitting a proxied device ownership request to the central processing system 304a (e.g., via the switch device 304b). In a specific example, the proxied device ownership request operations 1100 performed by the secondary processing system 306 at block 1002 may include the secondary processing system 306 generating a System Management Interrupt (SMI) and transmitting that SMI to the central processing system 304a (e.g., via the switch device 304b). However, in other specific examples the proxied device ownership request may be transmitted via intermediary device(s) at block 1002 while remaining within the scope of the present disclosure as well. For example, the secondary processing system 306 may utilize a BMC (e.g., the iDRAC discussed above) that is included in the computing system 300 (not illustrated) to transmit the proxied device ownership request at block 1002, which may include having a driver in that BMC generate and transmit the SMI to the central processing system 304a at block 1002 while remaining within the scope of the present disclosure as well. Furthermore, while a few specific examples of proxy device ownership requests are provided, one of skill in the art in possession of the present disclosure will appreciate that the secondary processing system 306 may request proxied device ownership in a variety of other manners that will fall within the scope of the present disclosure as well.

The method 1000 then proceeds to block 1004 where the central processing system enters a BIOS mode. In an embodiment, at block 1004 and in response to receiving the proxied device ownership request at block 1002, the central processing system 304a may enter a BIOS mode. For example, in response to receiving the SMI at block 1002, the central processing system 304a may enter a System Management Mode (SMM) that one of skill in the art in possession of the present disclosure will recognize allows the central processing system 304a to provide the BIOS sub-engine 304e that provides a BIOS that is configured to execute instructions. Furthermore, while the central processing system 304a is described as entering a BIOS mode and providing a BIOS, one of skill in the art in possession of the present disclosure will appreciate that the BIOS described herein may be a Unified Extensible Firmware Interface (UEFI) that defines a software interface between an operating system (e.g., provided by the operating system sub-engine 304d) and firmware in the computing system 300, and that was provide to replace legacy BIOS firmware, enable remote diagnostics and repair operations, and perform other UEFI/BIOS operations known in the art. However, while a specific example of entering a BIOS mode has been described, one of skill in the art in possession of the present disclosure will appreciate that the central processing system 304a may enter the BIOS/proxy mode described herein in other manners while remaining within the scope of the present disclosure as well.

Figure 12A:
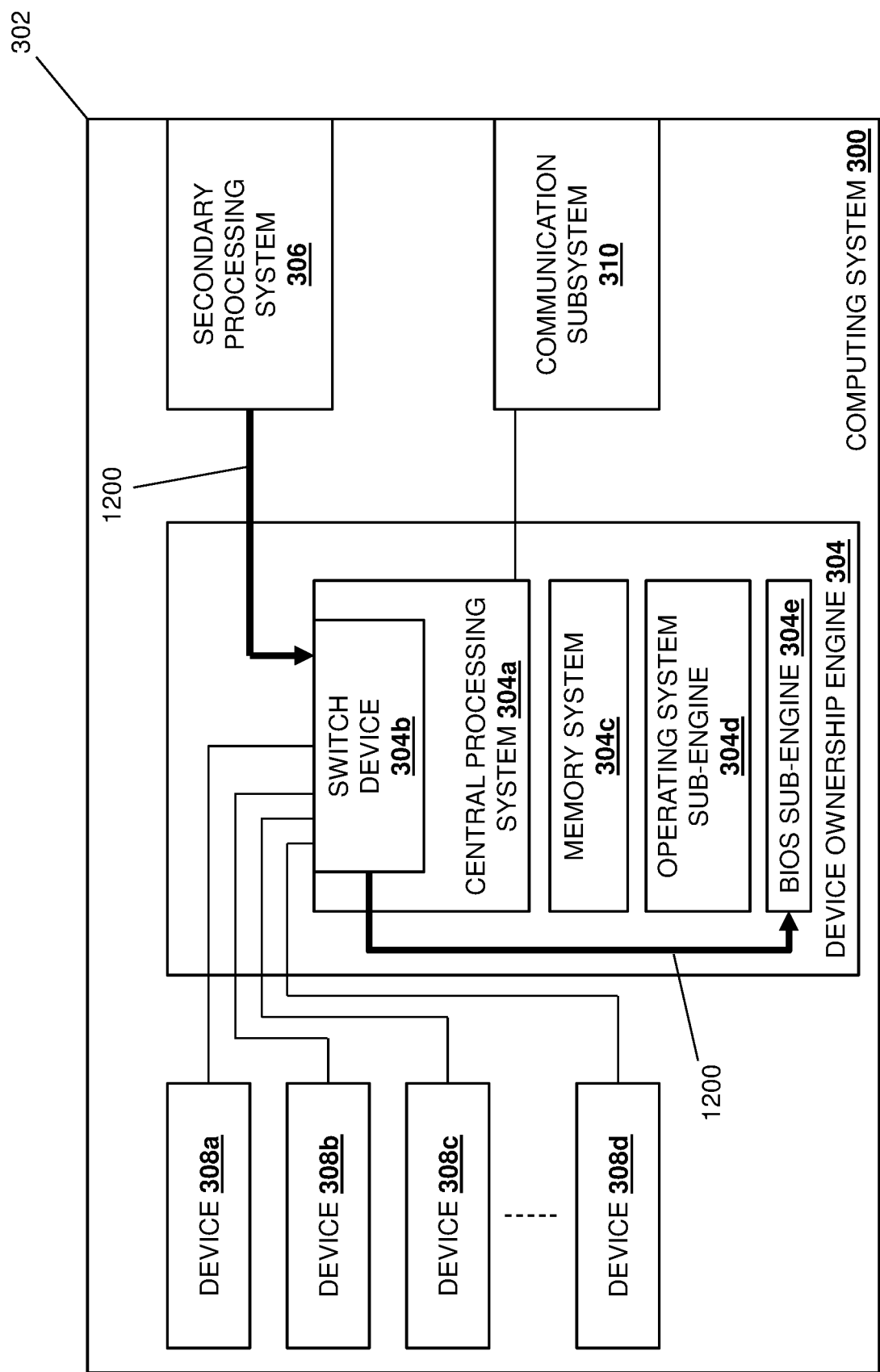
FIG. 12A is a schematic view illustrating an embodiment of a secondary processing system transmitting a write transaction to a central processing system in the computing system of FIG. 3 during the method of FIG. 10.
Figure 13A:
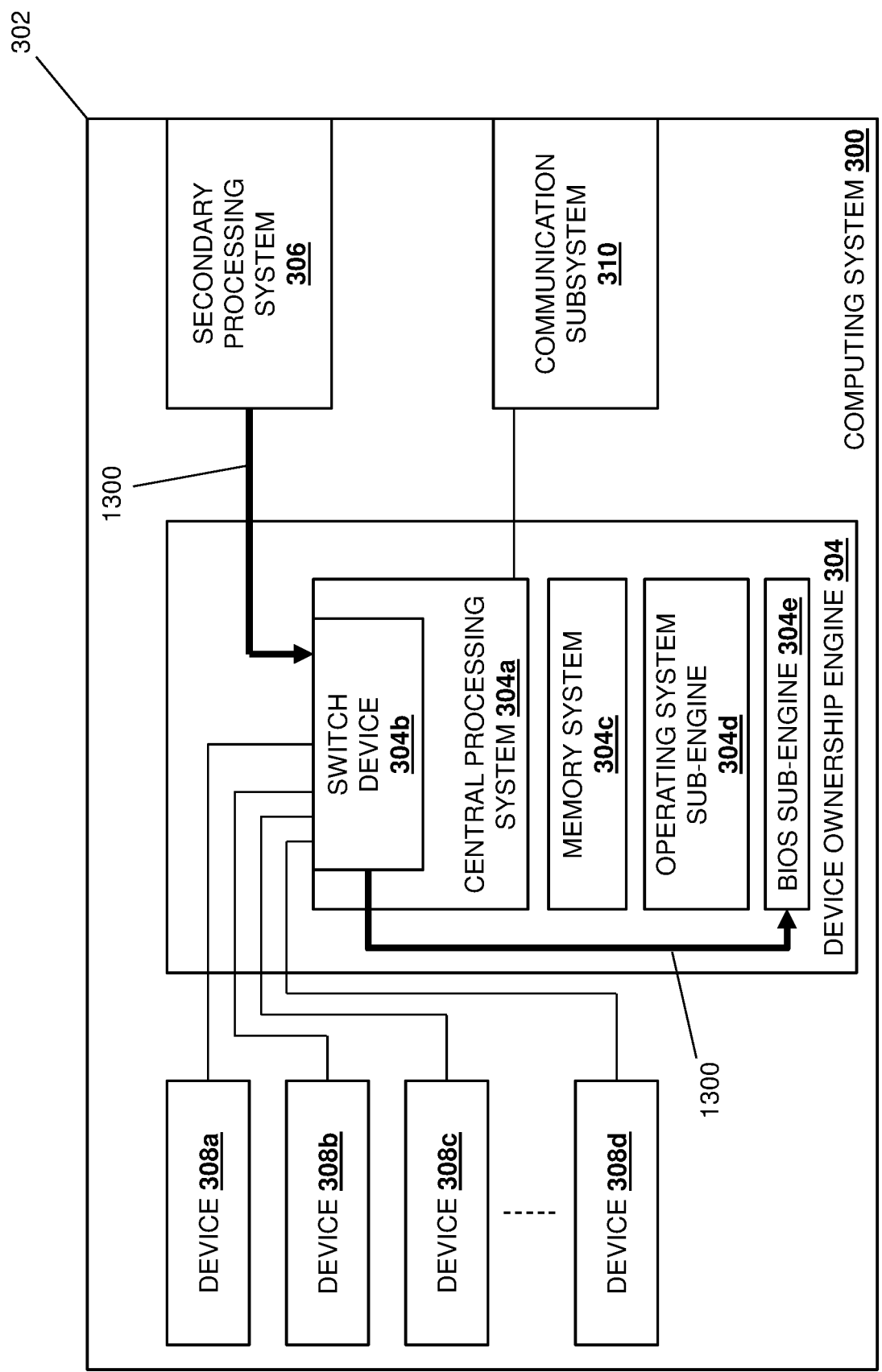
FIG. 13A is a schematic view illustrating an embodiment of a secondary processing system transmitting a read transaction to a central processing system in the computing system of FIG. 3 during the method of FIG. 10.

The method 1000 then proceeds to block 1006 where the central processing system uses the BIOS to receive a transaction generated by the secondary processing system and that is directed to a device. With reference to FIG. 12A, in an embodiment of block 1006, the secondary processing system 306 may perform transaction transmission operations 1200 that, in this specific example, include transmitting a write transaction to the central processing system 304a (e.g., via the switch device 304b). As will be appreciated by one of skill in the art in possession of the present disclosure, the transmission of the write transaction at block 1006 while the central processing system 304a is in the BIOS mode (e.g., the SMM discussed above) will allow that write transaction to be received by the BIOS provided by the BIOS sub-engine 304e (which is provided by the central processing system 304a as discussed above). Similarly, with reference to FIG. 13A, in an embodiment of block 1006, the secondary processing system 306 may perform transaction transmission operations 1300 that, in this specific example, include transmitting a read transaction to the central processing system 304a (e.g., via the switch device 304b). As will be appreciated by one of skill in the art in possession of the present disclosure, the transmission of the read transaction at block 1006 while the central processing system 304a is in the BIOS mode (e.g., the SMM discussed above) will allow that read transaction to be received by the BIOS provided by the BIOS sub-engine 304e (which is provided by the central processing system 304a as discussed above). However, while specific examples of read and write transactions are illustrated and described, one of skill in the art in possession of the present disclosure will appreciate how other transactions may fall within the scope of the present disclosure as well.

Figure 12B:
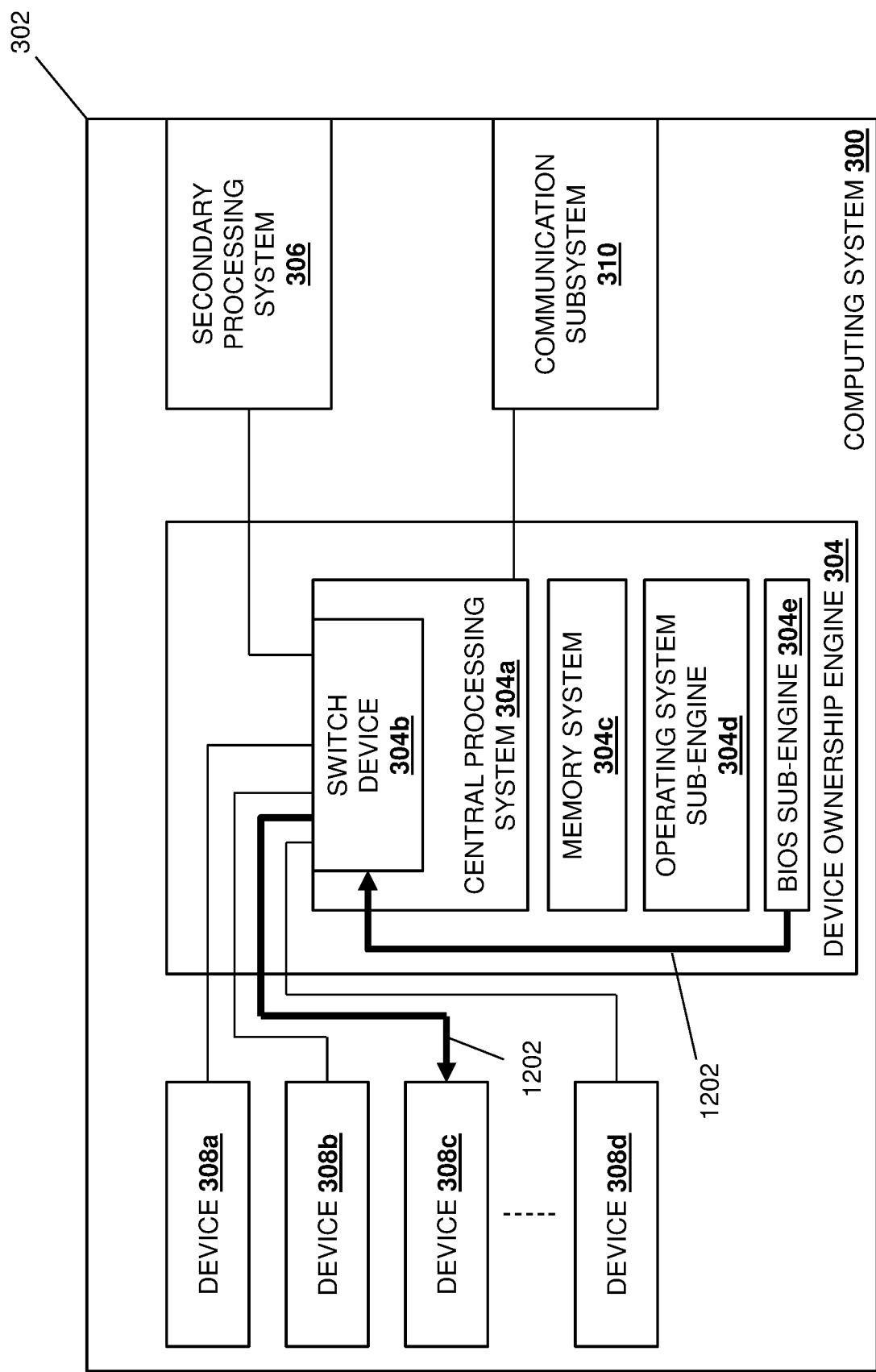
FIG. 12B is a schematic view illustrating an embodiment of a central processing system using a BIOS to execute a write transaction in the computing system of FIG. 3 during the method of FIG. 10.
Figure 13B:
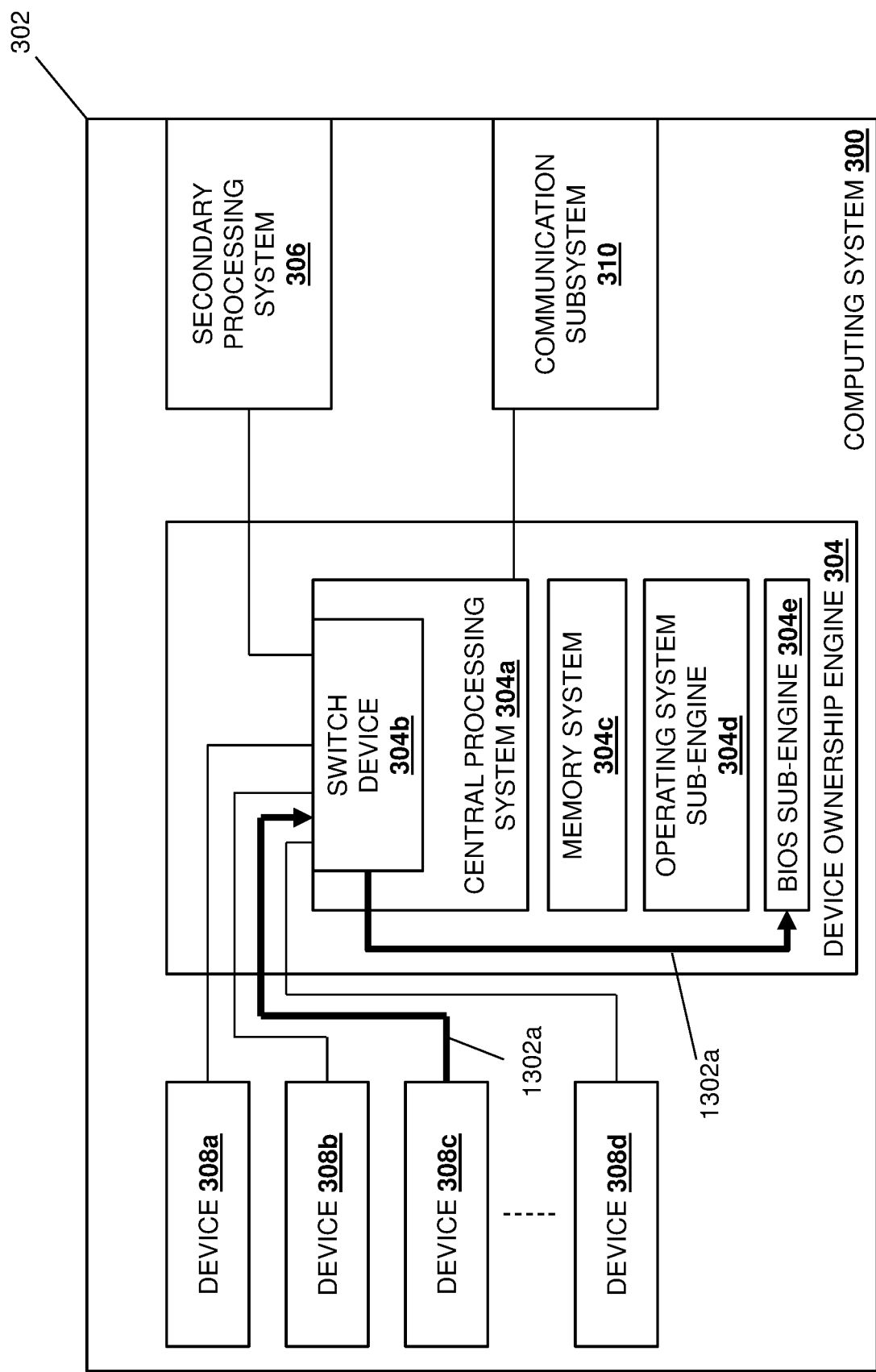
FIG. 13B is a schematic view illustrating an embodiment of a central processing system using a BIOS to execute a read transaction in the computing system of FIG. 3 during the method of FIG. 10.
Figure 13C:
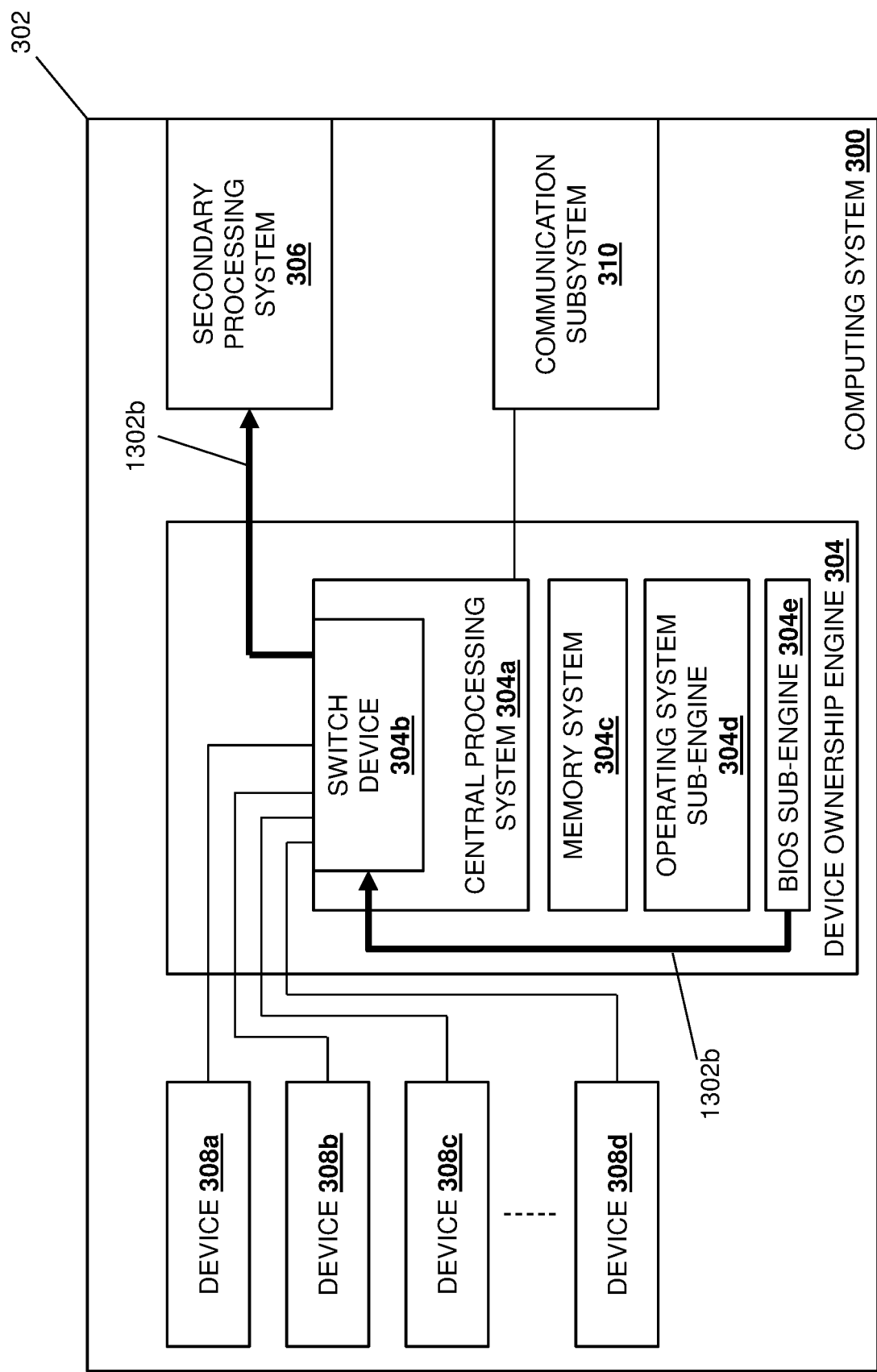
FIG. 13C is a schematic view illustrating an embodiment of a central processing system using a BIOS to execute a read transaction in the computing system of FIG. 3 during the method of FIG. 10.

The method 1000 then proceeds to block 1008 where the central processing system uses the BIOS to execute the transaction on the device. With reference to FIG. 12B, in an embodiment of block 1008 and in response to receiving the write transaction at block 1006, the central processing system 304a may use the BIOS provided via the BIOS sub-engine 304e to perform transaction execution operations 1202 that may include executing that write transaction via the switch device 304b and on the device 308c in order to write data to the device 308c, and one of skill in the art in possession of the present disclosure will appreciate that the writing of data to the device 308c may be performed in a variety of manners that will fall within the scope of the present disclosure. Similarly, with reference to FIGS. 13B and 13C, in an embodiment of block 1008 and in response to receiving the read transaction at block 1006, the central processing system 304a may use the BIOS provided via the BIOS sub-engine 304e to perform transaction execution operations 1302a that may include executing that read transaction via the switch device 304b and on the device 308c in order to read data from the device 308c, as well as perform transaction execution operations 1302b that may include executing that read transaction via the switch device 304b and with the secondary processing system 306 in order to transmit the data read from the device 308c to the secondary processing system 306, and one of skill in the art in possession of the present disclosure will appreciate that the reading of data from the device 308c and provisioning of that data to the secondary processing system 306 may be performed in a variety of manners that will fall within the scope of the present disclosure.

Thus, the systems and methods of the present disclosure provide for proxying of transactions between a secondary processing system and a device it owns using a BIOS in a central processing system connected to that secondary processing system and that device, thus allowing for the indirect ownership of devices by the secondary processing system via a "bridge" provided by an integrated switch device in a central processing system in situations in which the central processing system is configured to disallow or prevent peer-to-peer transactions between the secondary processing system and the device. As such, the benefits of the method 400 may be realized in computing systems with conventional or future central processing systems that have been configured to disallow or prevent the peer-to-peer transaction described as being utilized during that method 400, thus ensuring that the benefits of the method 400 discussed above may be realized in computing systems regardless of how the central processing system in that computing system is configured.

Figure 14:
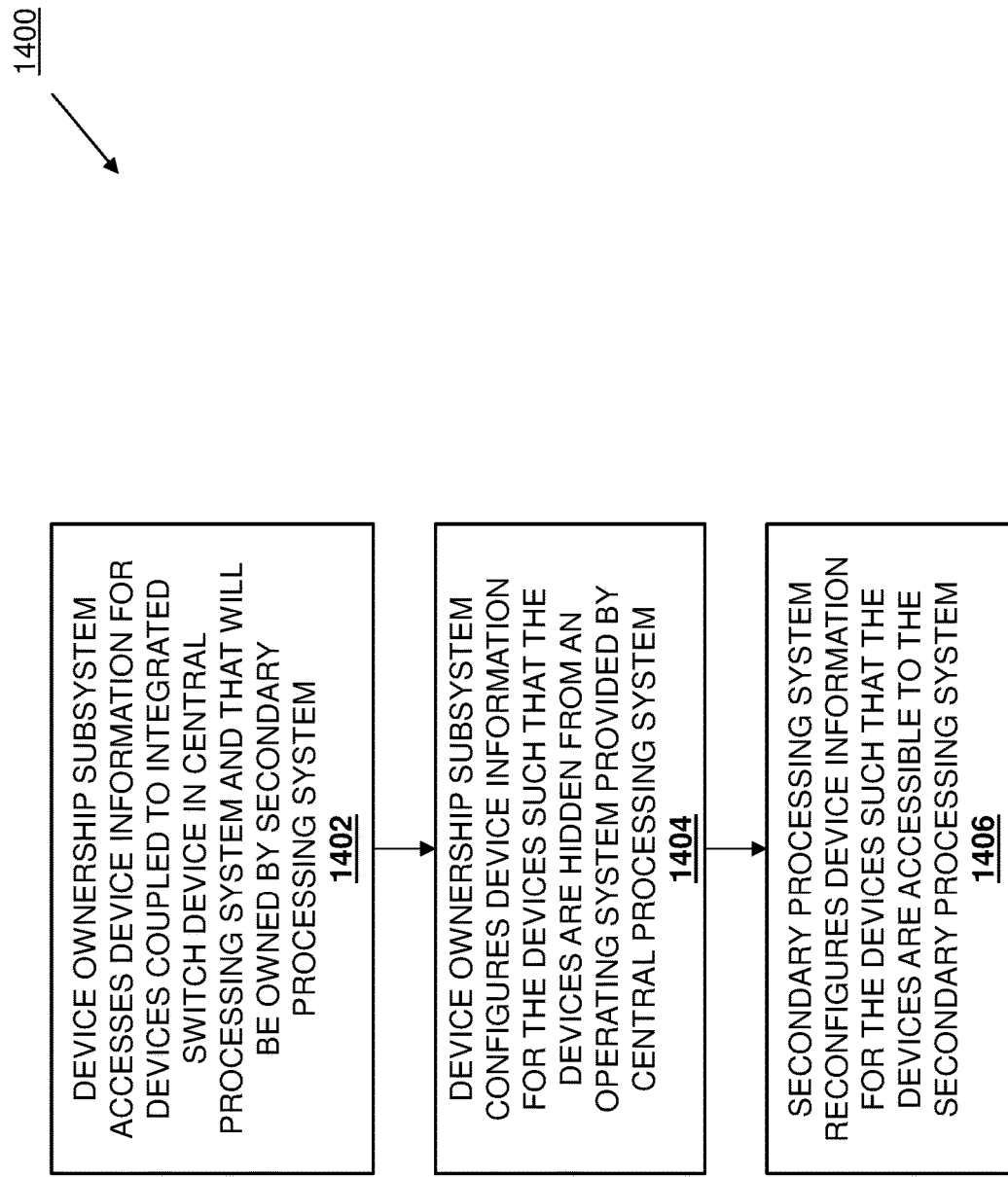
FIG. 14 is a flow chart illustrating an embodiment of a method for assigning device ownership for a secondary processing system.

Referring now to FIG. 14, an embodiment of a method 1400 for assigning device ownership for a secondary processing system is illustrated. As discussed below, some computing systems may not include the SFI (or similarly functionality) that is discussed above as being utilized to hide devices from the application(s) provided by the central processing system during the method 400. As such, the method 1000 provides for the assignment of device ownership to a secondary processing system without the need for an SFI or similar functionality. For example, the secondary processor device ownership assignment system of the present disclosure may include a chassis that houses devices, a secondary processing system, a central processing system that includes an integrated switch device that is coupled to each of the devices and the secondary processing system, and a device ownership subsystem that is coupled to the central processing system. The device ownership system accesses device information for a subset of the devices that will be owned by the secondary processing system, and configures the device information for the subset of the devices such that the subset of the devices are hidden from an operating system provided by the central processing system. The secondary processing system reconfigures the device information for the subset of the plurality of devices such that the subset of the plurality of devices are accessible by the secondary processing system. As such, in situations in which an SFI is not available, device ownership may be assigned to a secondary processing system in order to allow the method 400 to be performed.

As discussed above, a secondary processing system coupled to an integrated switch device in a central processing system may be assigned ownership of devices that are connected to the integrated switch device on that central processing system, and an SFI or similar functionality may be utilized to hide the devices owned by the secondary processing system from application(s) provided by the central processing system. However, the SFI functionality discussed above was only relatively recently added to the PCIe specification, and thus is not available with older central processing systems, has not been provided with some current central processing systems, and may not be provided with at least some future central processing systems. As such, the inventors of the present disclosure have developed techniques for hiding devices owned by the secondary processing system from the central processing systems using other techniques such that the method 400 discussed above may be performed to assign ownership of devices to each of the central processing system and the secondary processing system in computing systems in which an SFI is not available.

Figure 15:
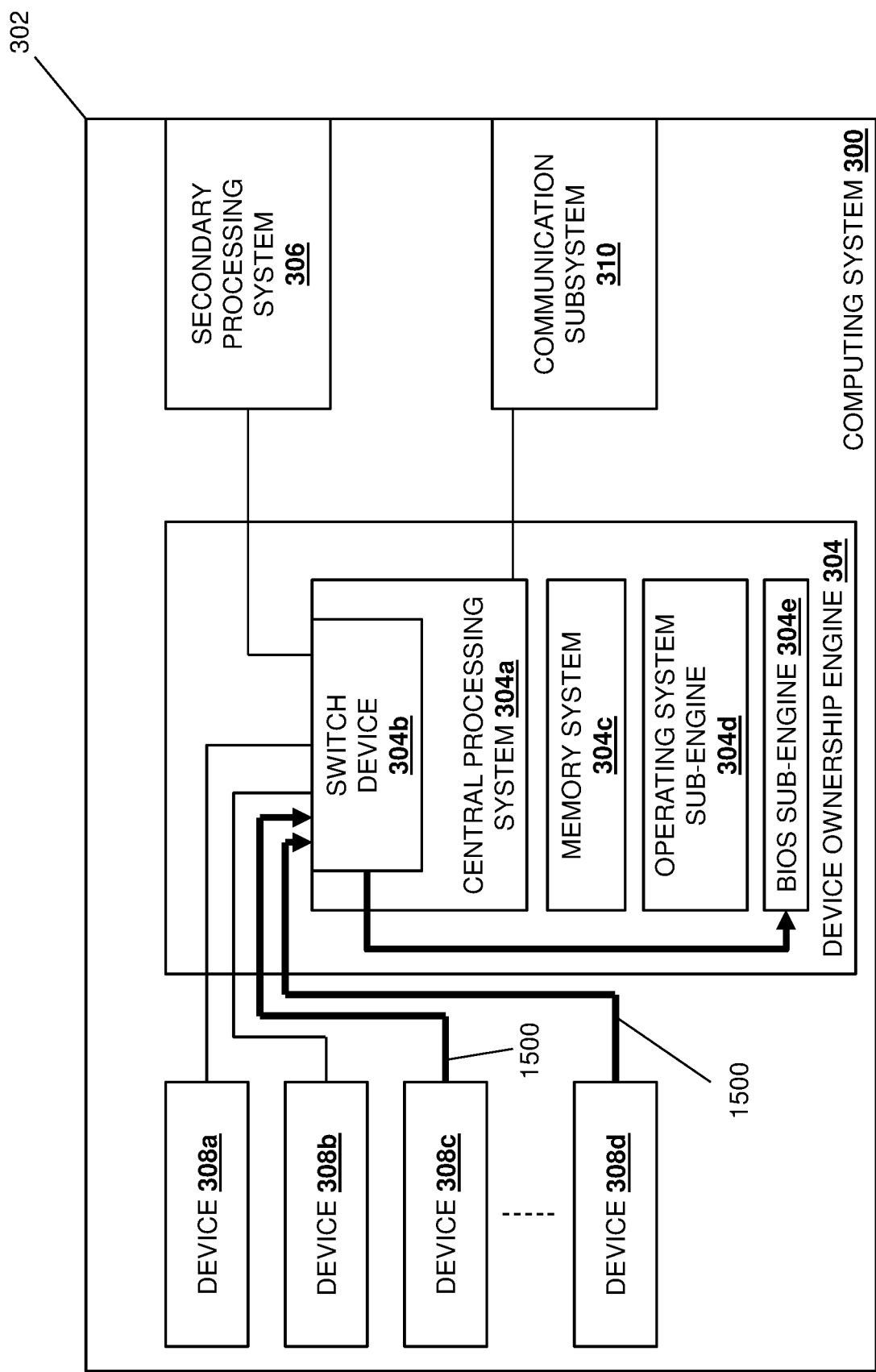
FIG. 15 is a schematic view illustrating an embodiment of a BIOS accessing device information from devices in the computing system of FIG. 3 during the method of FIG. 14.

The method 1400 begins at block 1402 where a device ownership subsystem accesses device information for devices that are coupled to an integrated switch device in a central processing system and that will be owned by a secondary processing system. As will be appreciated by one of skill in the art in possession of the present disclosure, the method 1400 may be performed before and/or during block 406 of the method 400 in order to hide the second subset of the devices from the at least one application provided by the central processing system. As such, with reference to FIG. 15 and in an embodiment of block 1402, the BIOS provided by the BIOS sub-engine 304e in the device ownership engine 304 may perform device information access operations 1500 that may include identifying, retrieving, and/or otherwise accessing device information about each of the devices 308c and up to 308d for which ownership will be assigned to the secondary processing system 306.

For example, during initialization operations for the computing system 202a/300 (e.g., a Power-On Self-Test (POST)), the BIOS provided by the BIOS sub-engine 304e in the device ownership engine 304 may identify that the secondary processing system 306 will be assigned ownership of the devices 308c and up to 308d (e.g., via device ownership information that may be stored in a database that is accessible to the BIOS, or otherwise available to the BIOS via techniques that would be apparent to one of skill in the art in possession of the present disclosure). In response to identifying that the devices 308c and up to 308d will be owned by the secondary processing system 306, the BIOS provided by the BIOS sub-engine 304e in the device ownership engine 304 may retrieve device class information, device subclass information, device vendor information, device identification information, and/or any other device information that would be apparent to one of skill in the art in possession of the present disclosure, from each of the devices 308c and up to 308d. One of skill in the art in possession of the present disclosure will appreciate how the device information retrieved at block 1402 for each device is described below as device information that allows for the retrieval of a device driver for that device, and thus any device information that enables the retrieval of a device driver for a device is envisioned as falling within the scope of the present disclosure. However, while particular device information for retrieving device drivers is discussed as being retrieved from the devices 308c and up to 308d, one of skill in the art in possession of the present disclosure will appreciate how other device information may be retrieved at block 1402 while remaining within the scope of the present disclosure as well.

Figure 16:
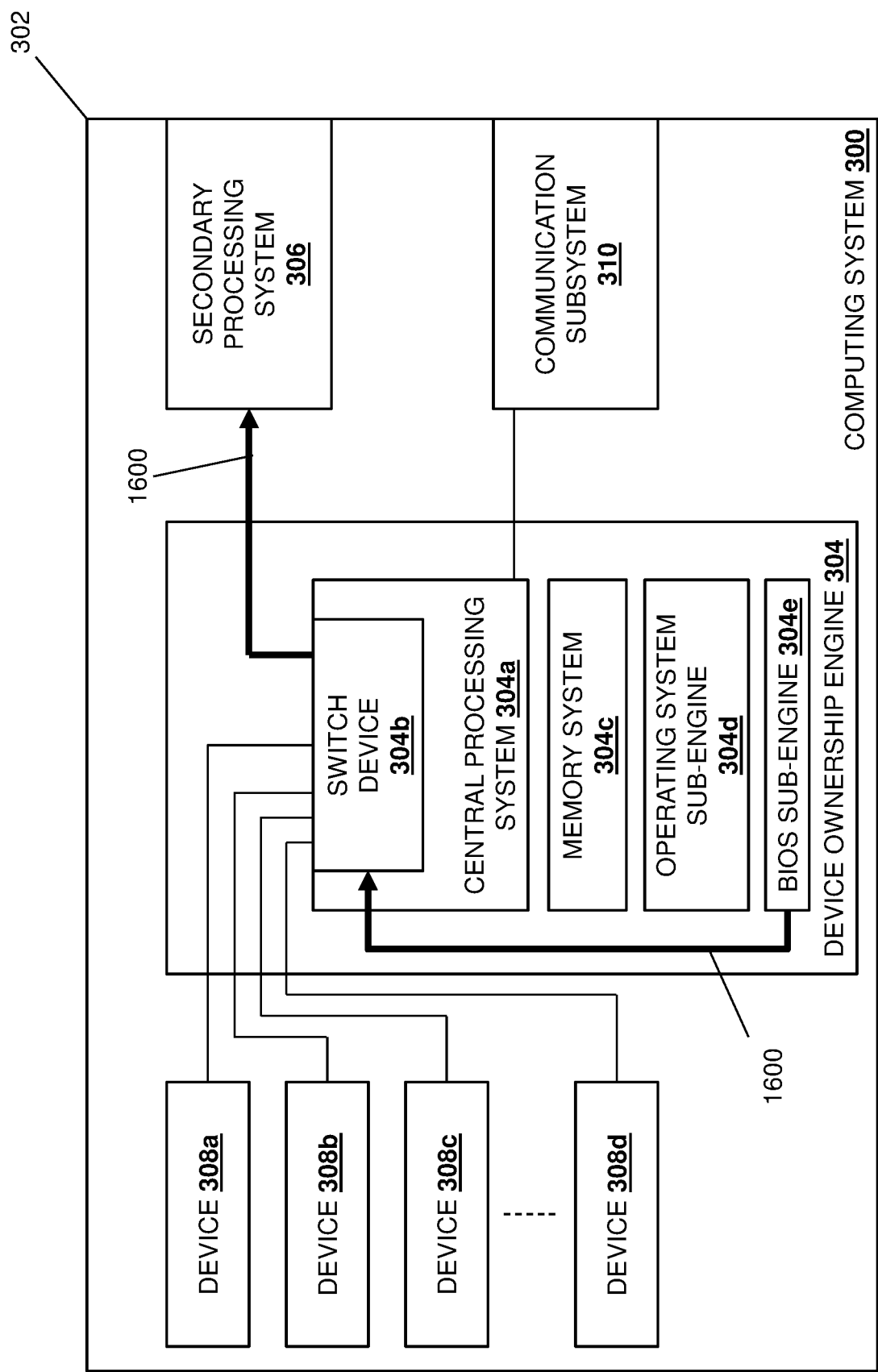
FIG. 16 is a schematic view illustrating an embodiment of a BIOS transmitting device information to a secondary processing system in the computing system of FIG. 3 during the method of FIG. 14.

In a specific example, at block 1402 the BIOS provided by the BIOS sub-engine 304e in the device ownership engine 304 may operate to store the device information retrieved at block 1402 in registers included as part of the device ownership engine 304, although the storage of the device information in other storage subsystems will fall within the scope of the present disclosure as well. With reference to FIG. 16, the BIOS provided by the BIOS sub-engine 304e in the device ownership engine 304 may perform device information communication operations 1600 that may include transmitting a device information communication that identifies the location of the device information retrieved at block 1402 via the switch device 304b and to the secondary processing system 306. Continuing with the specific example provided above, the device information communication transmitted at block 1402 may identify the registers in which the device information was stored, although one of skill in the art in possession of the present disclosure will appreciate how other techniques for sharing the device information with the secondary processing system 306 will fall within the scope of the present disclosure as well.

Figure 17:
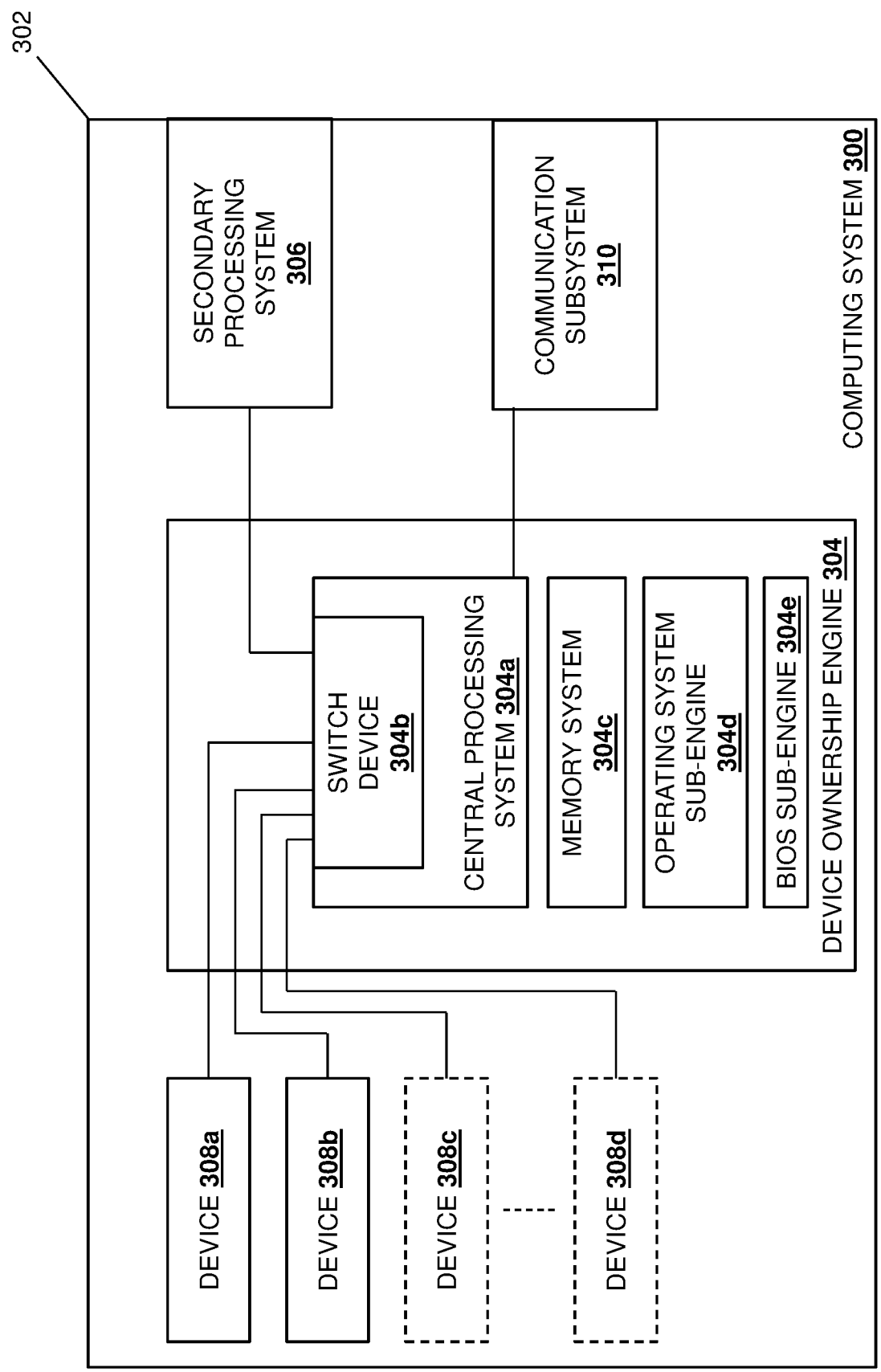
FIG. 17 is a schematic view illustrating an embodiment of the hiding of devices from an operating system provided by a central processing system in the computing system of FIG. 3 operating during the method of FIG. 14.

The method 1400 then proceeds to block 1404 where the device ownership subsystem configures the device information for the devices such that the devices are hidden from an operating system provided by the central processing system. With reference to FIG. 17, in an embodiment of block 1404, the BIOS provided by the BIOS sub-engine 304e in the device ownership engine 304 may operate to configure the device information retrieved at block 1402 such that the devices 308c and up to 308d are hidden from the operating system provided by the operating system sub-engine 304d in the device ownership engine 304 (as indicated by the devices 308c and up to 308d being illustrated in dashed lines in FIG. 17). For example, at block 1404, the BIOS provided by the BIOS sub-engine 304e in the device ownership engine 304 may operate to change the device information that was stored in the registers discussed above at block 1402 in a manner that prevents the operating system provided by the operating system sub-engine 304d in the device ownership engine 304 from retrieving device drivers for those devices 308c and up to 308d, thus causing those devices 308c and up to 308d to be viewed by the operating system as "benign" or "null" devices that will be ignored by the operating system during runtime. As such, one of skill in the art in possession of the present disclosure will appreciate how any change to the device information retrieved for devices at block 1402 that would prevent the retrieval of device drivers for those devices will fall within the scope of the present disclosure.

However, while the BIOS provided by the BIOS sub-engine 304e in the device ownership engine 304 is described as configuring the device information at block 1404 for the devices 308c and up to 308d such that those devices are hidden from an operating system provided by the central processing system 304a, one of skill in the art in possession of the present disclosure will appreciate how other subsystems in the computing system 202a/300 may operate to perform that configuration while remaining within the scope of the present disclosure as well. For example, the BMC (e.g., an iDRAC) discussed above may operate to configure the device information such that the devices 308c and up to 308d are hidden from an operating system provided by the central processing system 304a while remaining within the scope of the present disclosure as well. Thus, following block 1404 (e.g., during runtime of the computing system 202a/300), the devices 308c and up to 308d will be hidden from the operating system provided by the operating system sub-engine 304d in the device ownership engine 304.

Figure 18:
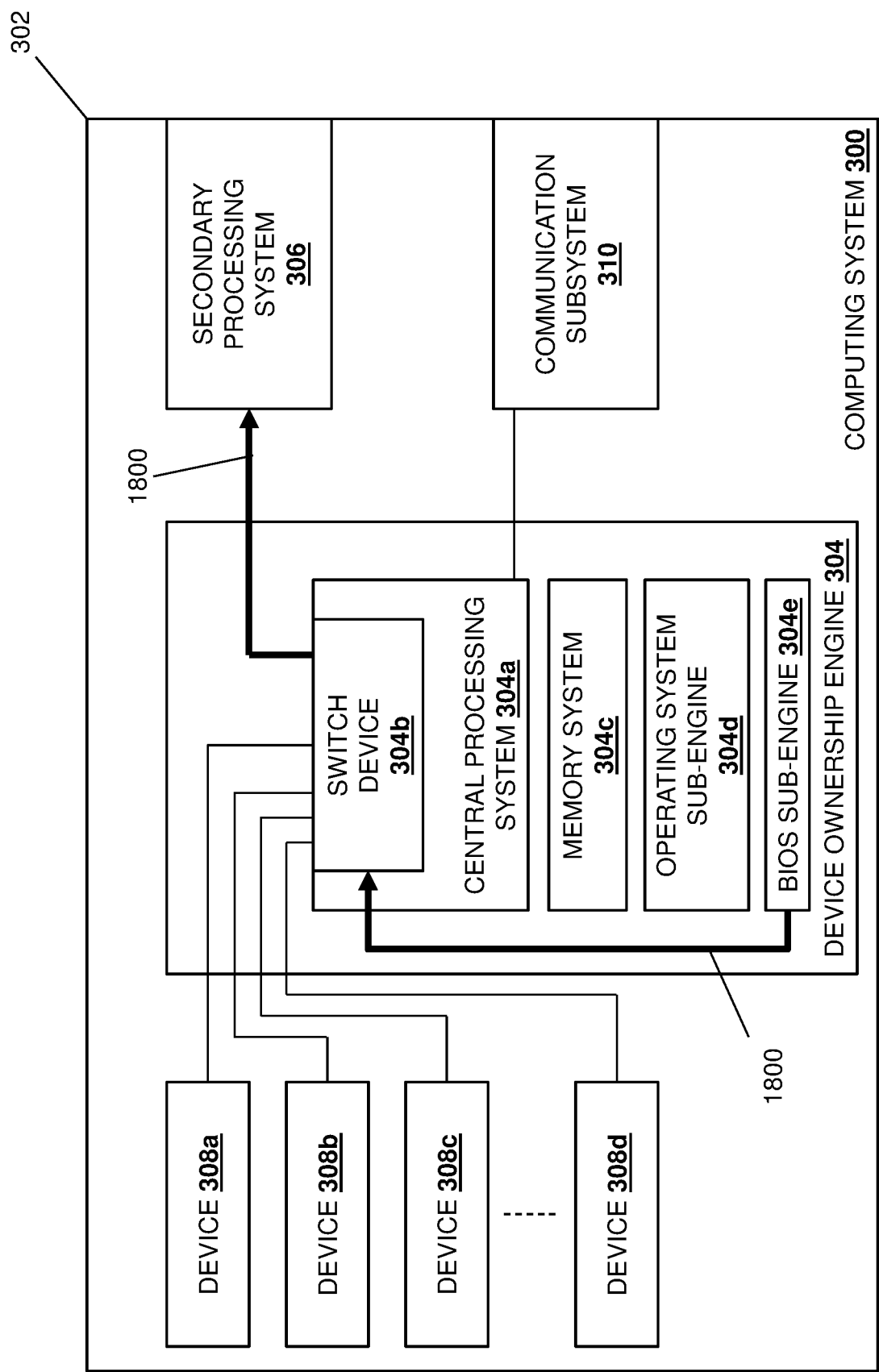
FIG. 18 is a schematic view illustrating an embodiment of a secondary processing system retrieving device information from a BIOS in the computing system of FIG. 3 during the method of FIG. 14.

The method 1400 then proceeds to block 1406 where the secondary processing system reconfigures the device information for the devices such that the devices are accessible to the secondary processing system. With reference to FIG. 18, in an embodiment of block 1406, the secondary processing system 306 may perform device information retrieval operations 1800 that may include attempting to retrieve the device information that was stored by the BIOS provided by the BIOS sub-engine 304e in the device ownership engine 304 at block 1402. Continuing with the example above, the device information retrieval operations 1800 performed at block 1406 may include an operating system (e.g., an SCP operating system) provided by the secondary processing system 306 attempting to retrieve the device information that was stored in the registers discussed above by the BIOS provided by the BIOS sub-engine 304e in the device ownership engine 304 at block 1402. However, while FIG. 18 illustrates those registers (or other storage subsystem) actually being accessed from a location that is included as part of the BIOS sub-engine 304e, as described below the device information retrieval operations 1800 performed at block 1406 may only include an attempt to retrieve the device information from registers (or other storage subsystems), and as discussed above those registers (or other storage subsystems) may be provided in other locations while remaining within the scope of the present disclosure as well.

At block 1406 and in response to the attempt to retrieve the device information, the secondary processing system 306 may operate to reconfigure the device information for the devices 308c and 308d such that the devices are accessible to the secondary processing system 306. In an embodiment, the secondary processing system 306 may include a bus-driver or other subsystem that is configured to intercept attempts by its operating system (e.g., the SCP operating system discussed above) to access the device information as discussed above (e.g., in the registers in which that device information is stored), and provide device information that will enable that operating system (provided by the secondary processing system 306) to retrieve device drivers for the devices 308c and up to 308d. As discussed above, the configuration of the device information by the device ownership engine 304 at block 1404 may have included changes to that device information that prevent the retrieval of device drivers for the devices 308c and up to 308d using that device information, and thus the operating system (e.g., an SCP operating system) provided by the secondary processing system 306 will also be unable to retrieve device drivers for the devices 308c and up to 308d using that device information.

As such, the bus-driver or other subsystem provided by the secondary processing system 306 may be configured to intercept access attempts by the operating system (e.g., an SCP operating system) provided by the secondary processing system 306 to the registers that include that device information, and insert corrected values for that device information in order to provide device information that will allow the operating system (e.g., an SCP operating system) provided by the secondary processing system 306 to retrieve device drivers for the devices 308c and up to 308d using that device information, and one of skill in the art in possession of the present disclosure will appreciate how a bus-driver or other subsystem may be configured with correct device information for the devices 308c and up to 308d, as well as the ability to provide that correct device information to the operating system provided by the secondary processing system 306, in a variety of manners that will fall within the scope of the present disclosure. Thus, following block 1406, the operating system (e.g., an SCP operating system) provided by the secondary processing system 306 may use the correct device information for the devices 308c and up to 308d to retrieve device drivers for those devices, thus allowing the ownership of those devices by the secondary processing system 306 as discussed above.

As such, following the method 1400, the devices 308c and up to 308d may be hidden from the operating system provided by the operating system sub-engine 304d in the device ownership engine 304, while the operating system (e.g., an SCP operating system) provided by the secondary processing system 306 may have retrieved device drivers for the devices 308c and up to 308d and utilized those device drivers to configure the secondary processing system 306 and/or the devices 308c and up to 308d so that the secondary processing system 306 may perform any of the ownership operations discussed above. Thus, systems and methods have been described that provide for assignment of ownership of devices to a secondary processing system and the hiding of those devices from a central processing system that does not include SFI functionality. As such, the benefits of the method 400 may be realized in computing systems with conventional or future central processing systems that are not configured with the SFI functionality that is described as being utilized during that method 400 to hide secondary-processing-system-owned devices from an operating system provided by the central processing system, thus ensuring that the benefits of the method 400 discussed above may be realized in computing systems regardless of how the central processing system in that computing system is configured.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A secondary processor proxied device ownership system, comprising:
   a chassis;
   a plurality of devices that are housed in the chassis;
   a secondary processing system that is housed in the chassis;
   a central processing system that is housed in the chassis and that includes an integrated switch device that couples each of the plurality of devices to the secondary processing system, wherein the central processing system is configured to:
      prevent the secondary processing system from performing peer-to-peer transactions with the plurality of devices via the integrated switch device;
      receive, via the integrated switch device from the secondary processing system, a System Management Interrupt (SMI) that was generated by the secondary processing system;

enter, in response to receiving the SMI, a System Management Mode (SMM) in which the central processing system provides a Basic Input Output System (BIOS);

receive, via the integrated switch device using the BIOS, a data request transaction that was generated by the secondary processing system and that requests the performance of a data operation on a first device that is included in the plurality of devices and that is separate from the BIOS and the secondary processing system; and execute, via the integrated switch device using the BIOS, the data request transaction on the first device.

2. The system of claim 1, wherein the SMI is received via at least one device that is coupled between the secondary processing system and the integrated switch device in the central processing system.

3. The system of claim 1, wherein the data request transaction is a write transaction and the central processing system is configured to:

execute, using the BIOS, the write transaction on the first device to write data to the first device.

4. The system of claim 1, wherein the peer-to-peer transactions prevented by the central processing system are Peripheral Component Interconnect express (PCIe) configuration transactions.

5. The system of claim 1, wherein the data request transaction is a read transaction and the central processing system is configured to:

execute, using the BIOS, the read transaction on the first device to read data from the first device.

6. The system of claim 5, wherein the central processing system is configured to:

execute, using the BIOS, the read transaction to transmit the data that was read from the first device to the secondary processing system.

7. An Information Handling System (IHS), comprising:

a central processing system including an integrated switch device; and a memory system that is coupled to the central processing system and that includes instructions that, when executed by the central processing system, cause the central processing system to:

prevent a secondary processing system from performing peer-to-peer transactions with a plurality of devices via the integrated switch device;

receive, from the secondary processing system via the integrated switch device, a System Management Interrupt (SMI) that was generated by the secondary processing system;

enter, in response to receiving the SMI, a System Management Mode (SMM) in which the central processing system provides a Basic Input Output System (BIOS);

receive, via the integrated switch device using the BIOS, a data request transaction that was generated by a secondary processing system and that requests the performance of a data operation on a first device that is included in a plurality of devices that are coupled to the integrated switch device and that is separate from the BIOS and the secondary processing system; and execute, via the integrated switch device using the BIOS, the data request transaction on the first device.

8. The IHS of claim 7, wherein the SMI is received via at least one device that is coupled between the secondary processing system and the integrated switch device in the central processing system.

9. The IHS of claim 8, wherein the at least one device that is coupled between the secondary processing system and the integrated switch device in the central processing system is a Baseboard Management Controller (BMC) device.

10. The IHS of claim 7, wherein the data request transaction is a write transaction and the central processing system is configured to:

execute, using the BIOS, the write transaction on the first device to write data to the first device.

11. The IHS of claim 7, wherein the peer-to-peer transactions prevented by the central processing system are Peripheral Component Interconnect express (PCIe) configuration transactions.

12. The IHS of claim 7, wherein the data request transaction is a read transaction and the central processing system is configured to:

execute, using the BIOS, the read transaction on the first device to read data from the first device.

13. The IHS of claim 12, wherein the central processing system is configured to:

execute, using the BIOS, the read transaction to transmit the data that was read from the first device to the secondary processing system.

14. A method for proxied device ownership for a secondary processing system, comprising:

preventing, by a central processing system, a secondary processing system from performing peer-to-peer transactions with a plurality of devices via an integrated switch device in the central processing system;

receiving, by the central processing system from the secondary processing system via the integrated switch device, a System Management Interrupt (SMI) that was generated by the secondary processing system;

entering, by a central processing system in response to receiving the SMI, a System Management Mode (SMM) in which the central processing system provides a Basic Input Output System (BIOS);

receiving, by the central processing system via the integrated switch device using the BIOS, a data request transaction that was generated by a secondary processing system and that requests the performance of a data operation on a first device that is included in a plurality of devices that are coupled to the integrated switch device and that is separate from the BIOS and the secondary processing system; and executing, by the central processing system via the integrated switch device using the BIOS, the data request transaction on the first device.

15. The method of claim 14, wherein the SMI is received via at least one device that is coupled between the secondary processing system and the integrated switch device in the central processing system.

16. The method of claim 15, wherein the at least one device that is coupled between the secondary processing system and the integrated switch device in the central processing system is a Baseboard Management Controller (BMC) device.

17. The method of claim 14, wherein the data request transaction is a write transaction and the method includes:

executing, by the central processing system using the BIOS, the write transaction on the first device to write data to the first device.

18. The method of claim 14, wherein the peer-to-peer transactions prevented by the central processing system are Peripheral Component Interconnect express (PCIe) configuration transactions.

19. The method of claim 14, wherein the data request transaction is a read transaction and the method includes:
   executing, by the central processing system using the BIOS, the read transaction on the first device to read data from the first device.

20. The method of claim 19, further comprising:
   executing, by the central processing system using the BIOS, the read transaction to transmit the data that was read from the first device to the secondary processing system.

* * * * *